United States Patent
Uchida

(10) Patent No.: US 10,027,175 B2
(45) Date of Patent: Jul. 17, 2018

(54) WIRELESS POWER TRANSFER SYSTEM AND WIRELESS POWER TRANSFER METHOD

(71) Applicant: FUJITSU LIMITED, Kawasaki-shi, Kanagawa (JP)

(72) Inventor: Akiyoshi Uchida, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 306 days.

(21) Appl. No.: 14/861,091

(22) Filed: Sep. 22, 2015

(65) Prior Publication Data

US 2016/0013666 A1 Jan. 14, 2016

Related U.S. Application Data

(63) Continuation of application No. PCT/JP2013/058758, filed on Mar. 26, 2013.

(51) Int. Cl.
| | |
|---|---|
| *H01F 27/42* | (2006.01) |
| *H02J 50/12* | (2016.01) |
| *H02J 7/02* | (2016.01) |
| *H02J 50/40* | (2016.01) |
| *H02J 50/80* | (2016.01) |

(52) U.S. Cl.
CPC ............. *H02J 50/12* (2016.02); *H02J 7/025* (2013.01); *H02J 50/40* (2016.02); *H02J 50/80* (2016.02)

(58) Field of Classification Search
CPC ............. H02J 50/12; H02J 50/80; H02J 50/40
USPC .......... 307/104; 455/41.1; 700/292, 295, 286
See application file for complete search history.

(56) References Cited

U.S. PATENT DOCUMENTS

| | | | | |
|---|---|---|---|---|
| 2009/0264069 | A1 | 10/2009 | Yamasuge | |
| 2009/0281678 | A1 | 11/2009 | Wakamatsu | |
| 2010/0256831 | A1* | 10/2010 | Abramo | H02J 17/00 700/292 |

FOREIGN PATENT DOCUMENTS

| | | |
|---|---|---|
| EP | 2555378 A1 | 2/2013 |
| EP | 2953236 A1 | 12/2015 |
| JP | 2008-154116 | 7/2008 |
| JP | 2008-283789 | 11/2008 |
| JP | 2009-213295 | 9/2009 |
| JP | 2009-261157 | 11/2009 |
| JP | 2009-278707 | 11/2009 |
| JP | 2011-199975 | 10/2011 |
| JP | 2013-048527 | 3/2013 |
| KR | 10-2012-0137382 | 12/2012 |
| WO | 2010-122598 A1 | 10/2010 |

OTHER PUBLICATIONS

JPOA—Office Action of Japanese Patent Application No. 2015-507735 dated Nov. 1, 2016, with partial English Translation of the Office Action.

(Continued)

*Primary Examiner* — Thomas Skibinski
(74) *Attorney, Agent, or Firm* — Fujitsu Patent Center

(57) ABSTRACT

A wireless power transfer system including a plurality of power supply coils, and wirelessly performing power transfer from the power supply coils to a power receiver, includes an entire controller. The entire controller is configured to control the power transfer performed by wirelessly transmitting and receiving powers of the power supply coils and the power receiver, in accordance with confirming power transfer ranges of the plurality of power supply coils.

17 Claims, 28 Drawing Sheets

(56) References Cited

OTHER PUBLICATIONS

KROA—Korean Office Action dated Oct. 26, 2016 for Korean Patent Application No. 10-2015-7025764, with English translation.
CNOA—Chinese Office Action dated Apr. 24, 2017 for Chinese Patent Application No. 201380075023.2, with English translation.
Akiyoshi Uchida et al., "Phase and Intensity Control of Multiple Coil Currents in Resonant Magnetic Coupling", THU-C-1, pp. 53-56, May 10-11, 2012 (4 pages).
Toshio Ishizaki et al., "3-D Free-Access WPT System for Charging Movable Terminals", FRI-H-1, pp. 219-222, May 10-11, 2012 (4 pages).
International Search Report and Written Opinion of the International Searching Authority (Form PCT/ISA/210, Form PCT/ISA/237), mailed in connection with PCT/JP2013/058758 and dated Jun. 25, 2013 (9 pages).
EESR—The Extended European Search Report dated Mar. 2, 2016 for corresponding European Patent application No. 13880278.0.
CNOA—Office Action of CN Patent Application No. 201380075023.2 dated Dec. 8, 2017, with English translation.

* cited by examiner

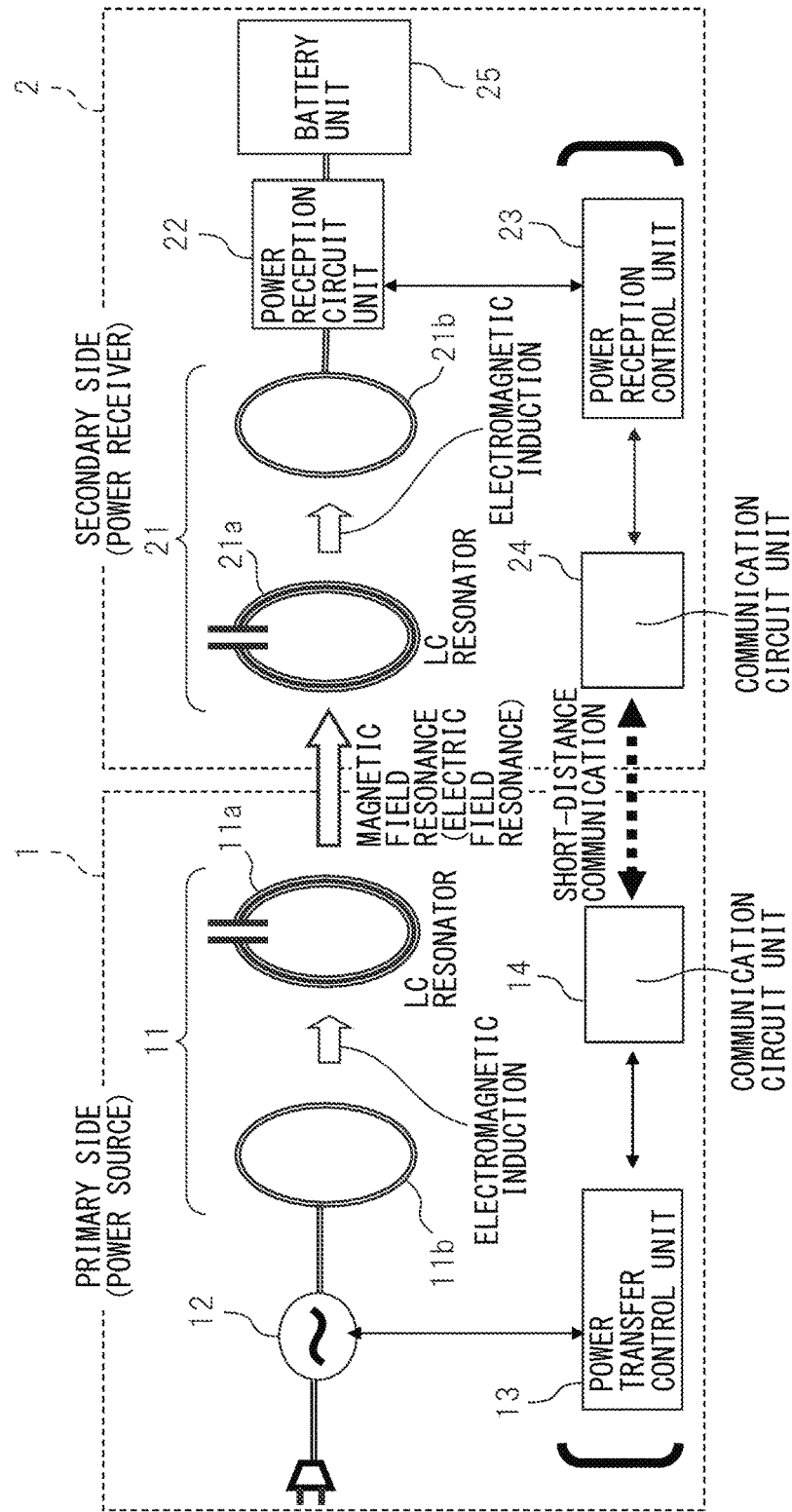

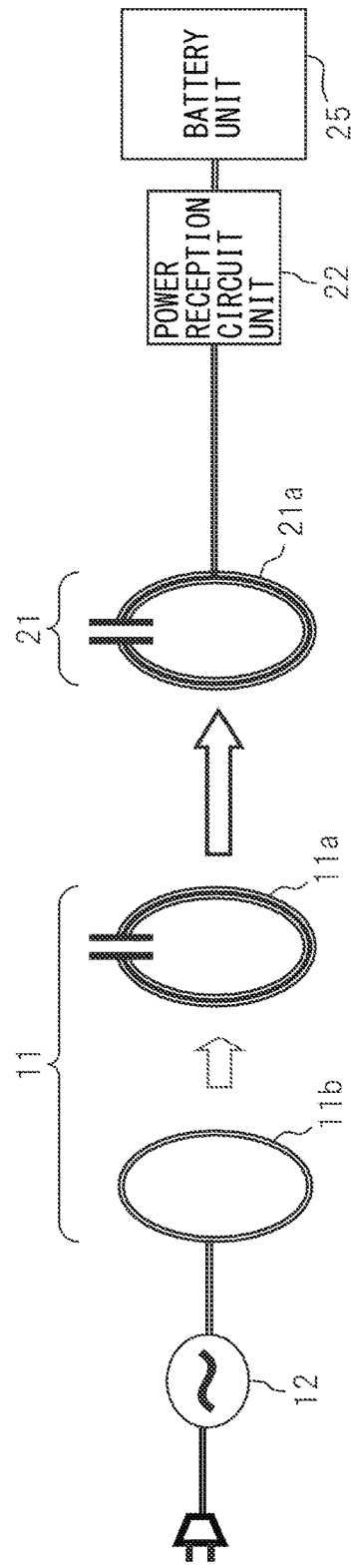

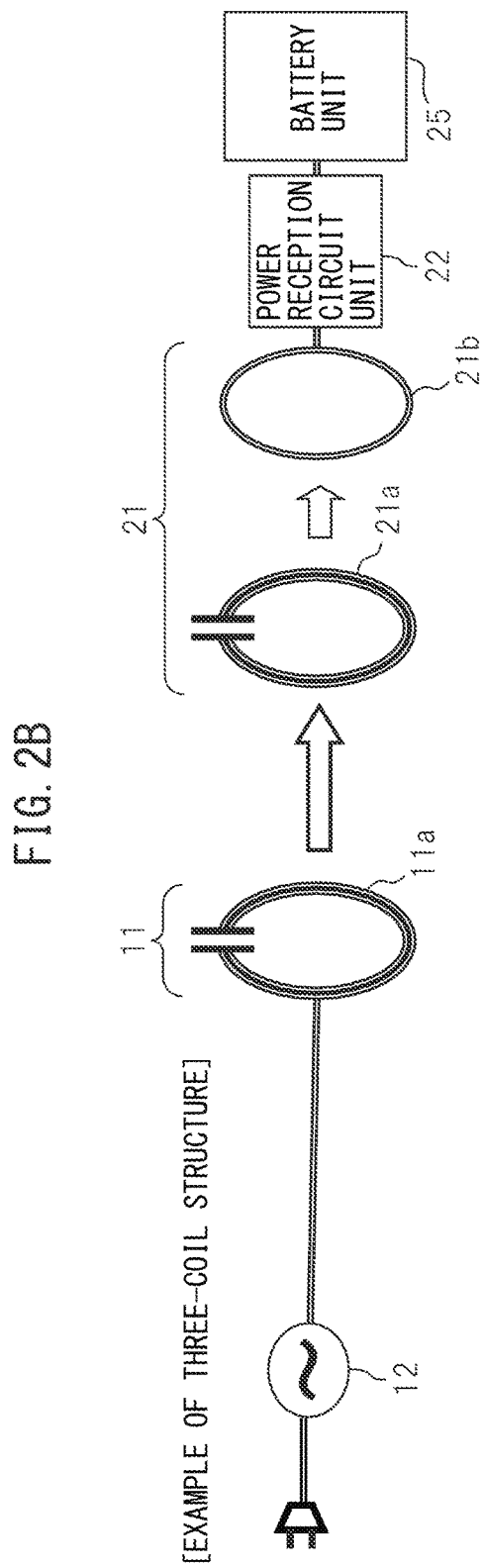

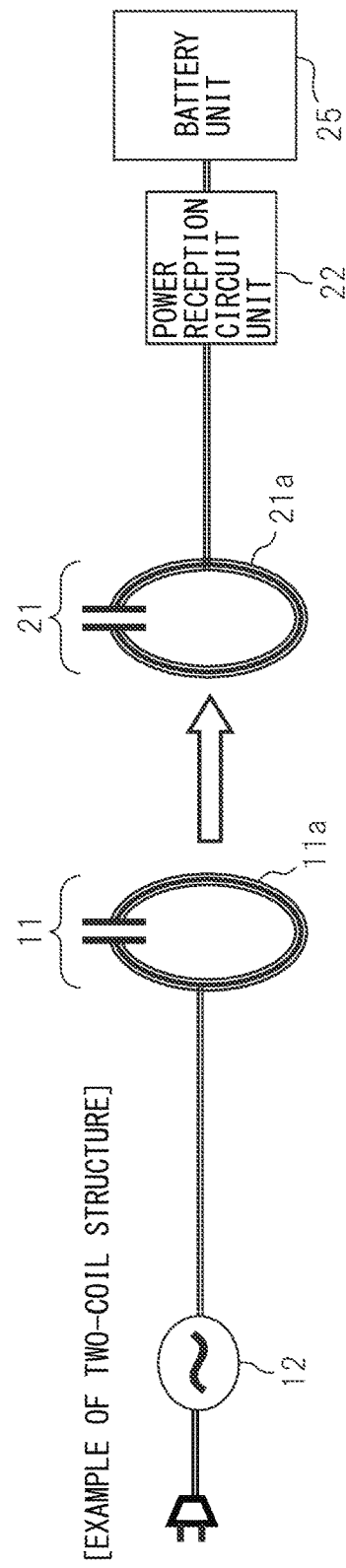

[IN-PHASE OUTPUT]

FIG. 7

| | WITHIN MASTER COMMUNICATION AREA | WITHIN SLAVE COMMUNICATION AREA | WITHIN MASTER POWER TRANSFER AREA | WITHIN SLAVE POWER TRANSFER AREA | OPERATION |
|---|---|---|---|---|---|
| POWER RECEIVER 2A | × | × | × | × | WAITS FOR COMMUNICATION FROM POWER SOURCE |
| POWER RECEIVER 2B | ○ | × | × | × | COMMUNICATES WITH POWER SOURCE 1A→ CONFIRMED TO BE OUTSIDE POWER AREA |
| POWER RECEIVER 2C | ○ | ○ | × | × | COMMUNICATES WITH POWER SOURCES 1A AND 1B →CONFIRMED TO BE OUTSIDE POWER AREA |
| POWER RECEIVER 2D | ○ | ○ | ○ | × | COMMUNICATES WITH POWER SOURCES 1A AND 1B →CONFIRMED TO BE WITHIN POWER AREA OF 1A |
| POWER RECEIVER 2E | ○ | ○ | ○ | ○ | COMMUNICATES WITH POWER SOURCES 1A AND 1B →CONFIRMED TO BE WITHIN POWER AREAS OF 1A AND 1B |

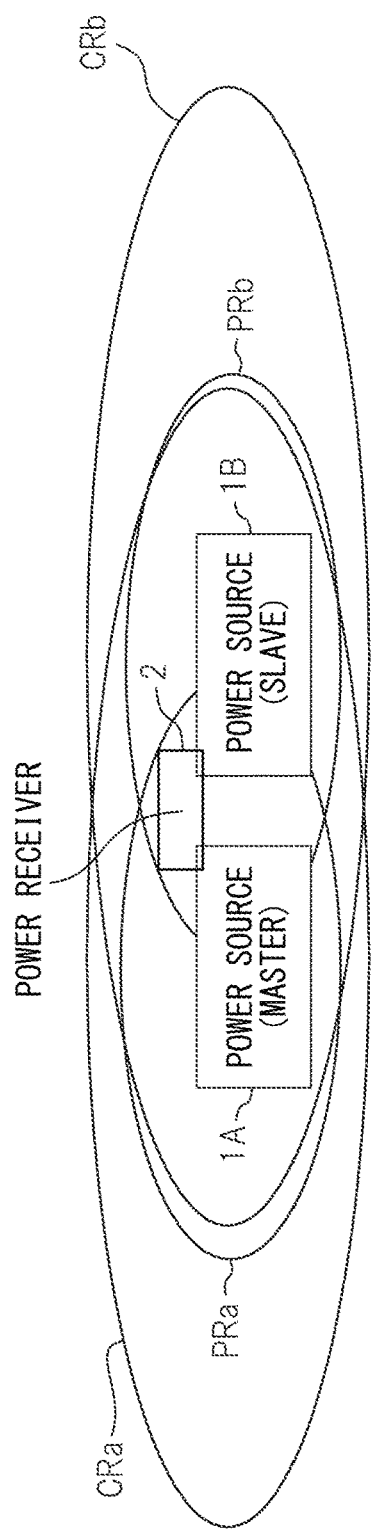

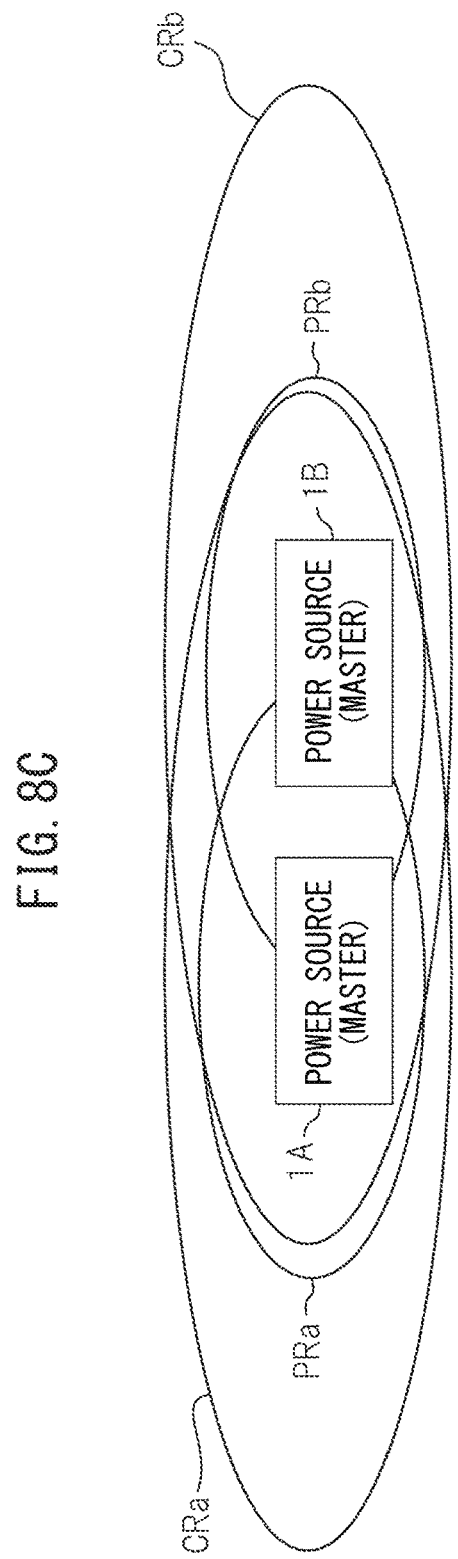

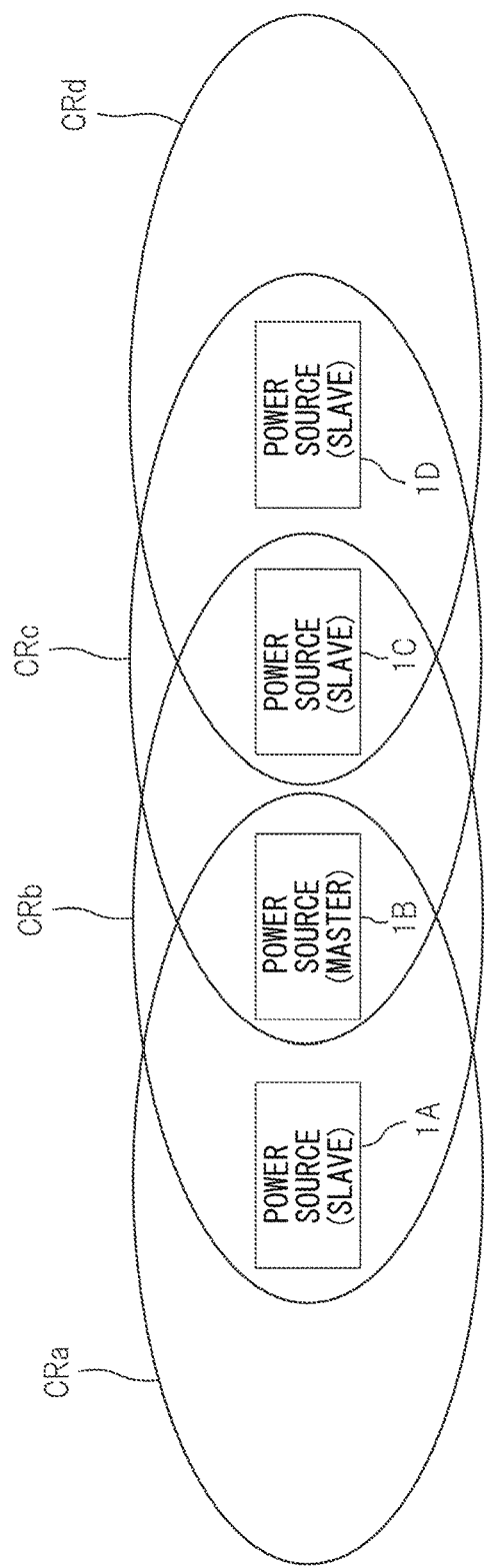

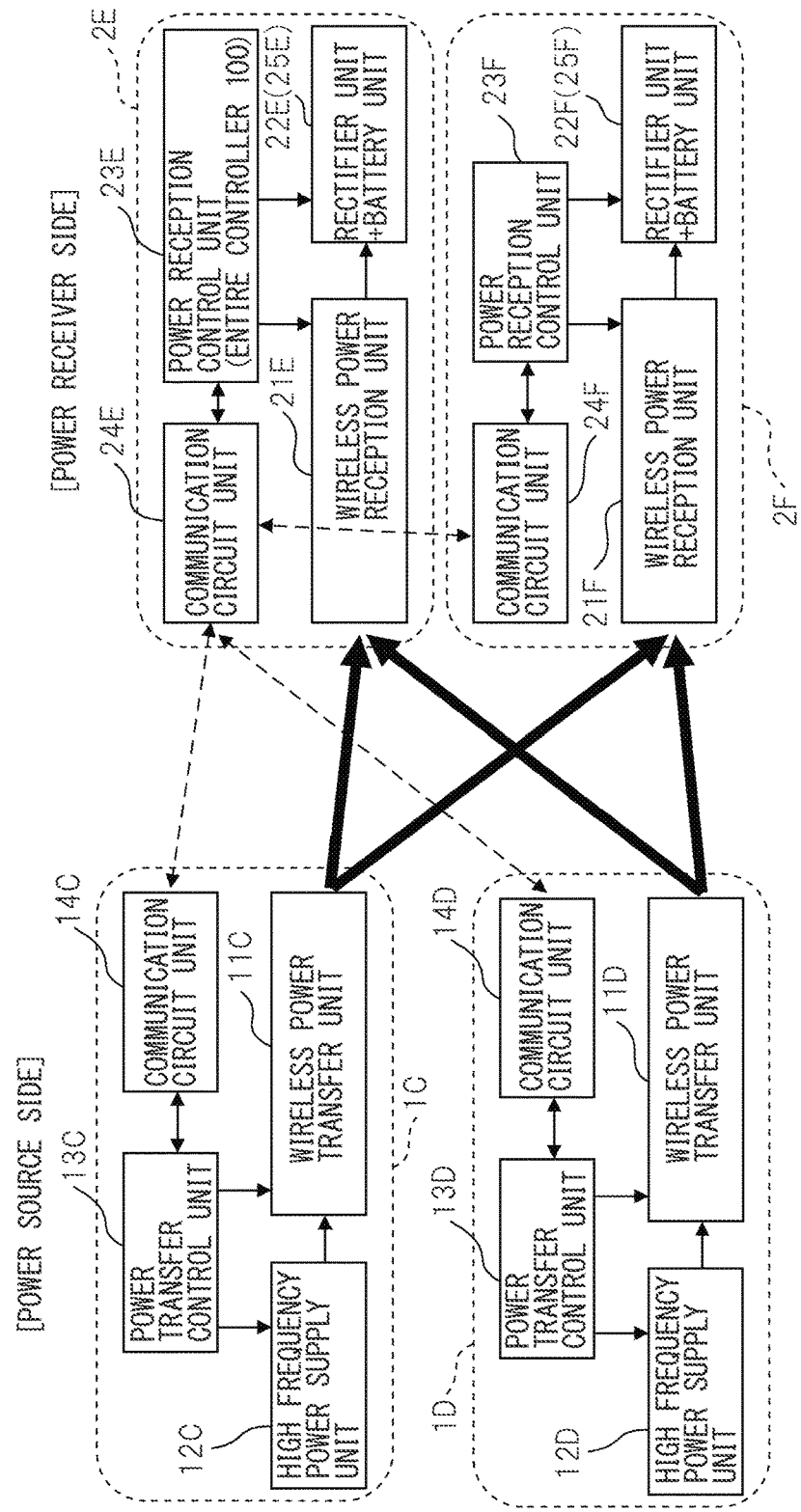
F I G. 15C

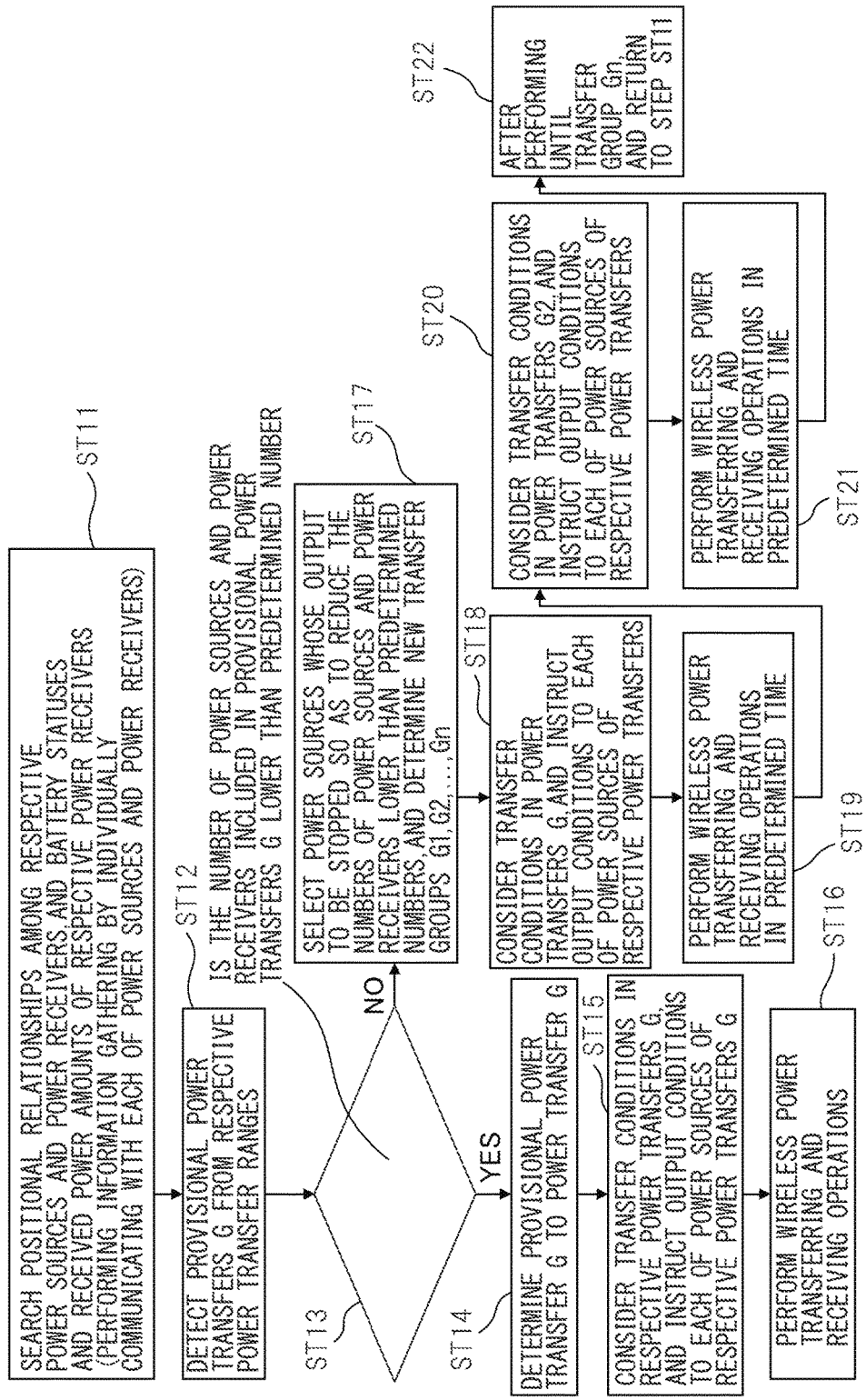

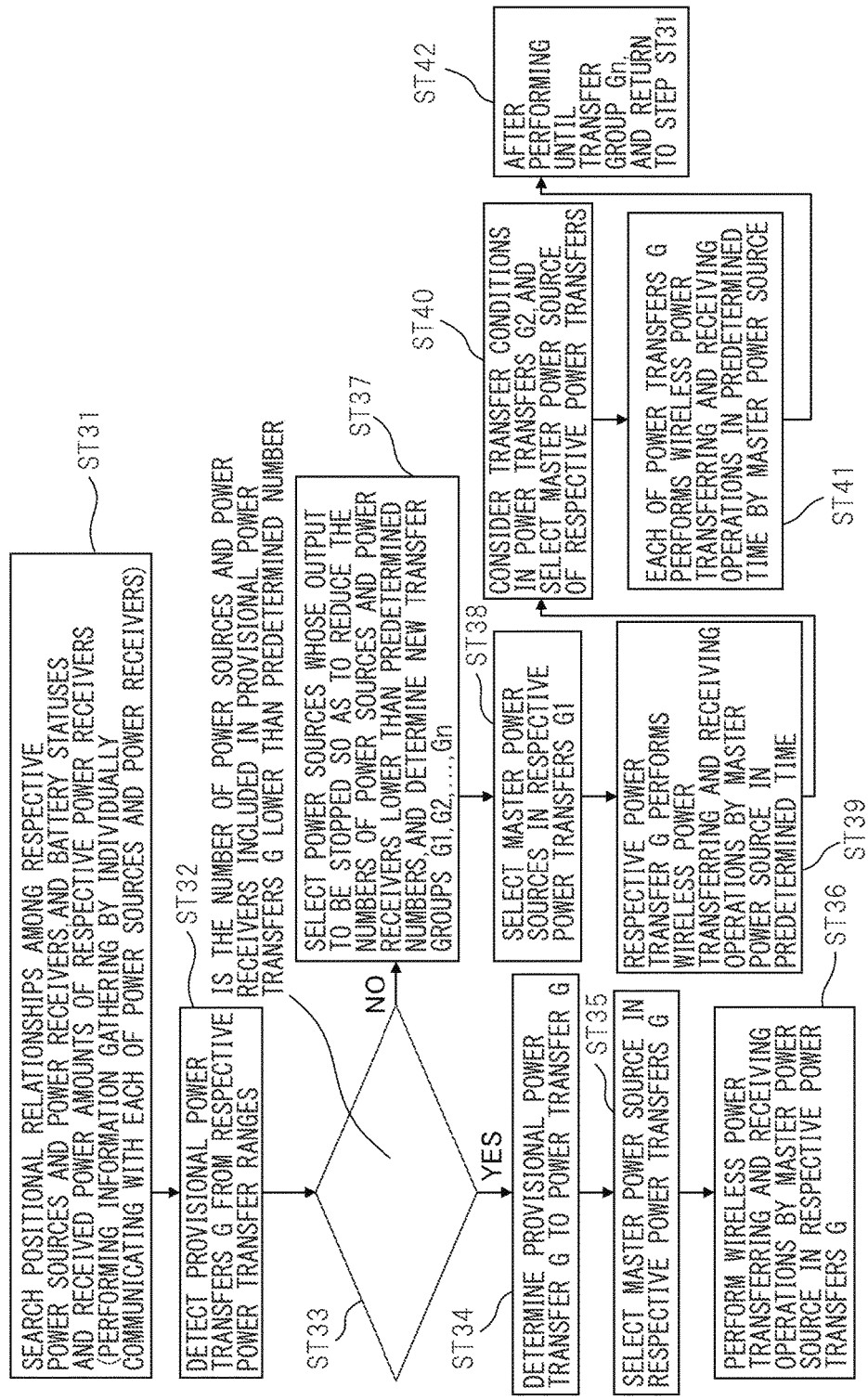

WIRELESS POWER TRANSFER SYSTEM AND WIRELESS POWER TRANSFER METHOD

CROSS-REFERENCE TO RELATED APPLICATION

This application is a continuation application and is based upon PCT/JP2013/058758, filed on Mar. 26, 2013, the entire contents of which are incorporated herein by reference.

FIELD

Embodiments discussed herein relate to a wireless power transfer system and a wireless power transfer method.

BACKGROUND

In order to perform power supply or perform charging, wireless power transfer techniques have been gaining attention. Research and development are being conducted regarding a wireless power transfer system wirelessly performing power transfer to various electronic apparatuses such as mobile terminals and notebook computers and household electrical appliances or to power infrastructure equipment.

Note that, in general, a strong coupling wireless power transfer technology uses four procedures of electromagnetic induction, magnetic field resonance, electric field induction, and electric field resonance.

Conventionally, techniques using electromagnetic induction, and techniques using radio waves are known as this kind of wireless power transfer, and for example, the wireless power transfer using electromagnetic induction has been used to transmit power to various consumer electronics such as a shaver or an electric toothbrush.

On the other hand, recently, there have been raised expectations for power transfer techniques using magnetic field resonance and electric field resonance as techniques being capable of transferring power to a plurality of power receivers while placing each power receiver at a certain distance from a power source, or to various three-dimensional positions of each power receiver.

In a wireless power transfer system using resonance phenomena, a high efficiency power transfer may be possible, even though distances or sizes of respective power sources and power receivers. Further, when a power receiver is located at a position within an area of overlapping power transfer areas (power transfer ranges) of a plurality of power sources, a high efficiency of wirelessly transferring power may be realized for various postured power receivers by optimizing intensities and phases of the respective power sources.

As described above, power transfer suitable for a position or posture of the power receiver may be performed by controlling intensities and phases of outputs of a plurality of power sources wherein power transfer ranges of the power sources are overlapped.

However, when the number of power sources is plural, calculations for obtaining phases and intensities of the power sources may become complicated. Specifically, when a power receiver is located at a position within an area of overlapping power transfer ranges of a plurality of power sources, so as to perform an optimized power transfer, the plurality of power sources may be controlled, and therefore, a processing time for calculating the phases and intensities becomes long and resources for performing calculations becomes large.

Therefore, in the wireless power transfer system including a plurality of power sources and a plurality of power receivers where power transfer ranges are overlapped, there are some fears that power transfer may not performed in an optimum state. Further, for example, practical realizations of a wireless power transfer system using magnetic field resonance or electric field resonance may be delayed.

A variety of wireless power transfer techniques have conventionally been proposed.

Patent Document 1: Japanese Laid-open Patent Publication No. 2011-199975
Patent Document 2: Japanese Laid-open Patent Publication No. 2008-283789
Non-Patent Document 1: UCHIDA Akiyoshi, et al., "Phase and Intensity Control of Multiple Coil Currents in Resonant Magnetic Coupling," IMWS-IWPT2012, THU-C-1, pp. 53-56, May 10-11, 2012
Non-Patent Document 2: ISHIZAKI Toshio, et al., "3-D Free-Access WPT System for Charging Movable Terminals," IMWS-IWPT2012, FRI-H-1, pp. 219-222, May 10-11, 2012

SUMMARY

According to an aspect of the embodiments, there is provided a wireless power transfer system including a plurality of power supply coils, and wirelessly performing power transfer from the power supply coils to a power receiver, includes an entire controller.

The entire controller is configured to control the power transfer performed by wirelessly transmitting and receiving powers of the power supply coils and the power receiver, in accordance with confirming power transfer ranges of the plurality of power supply coils.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram schematically depicting one example of a wireless power transfer system;

FIG. 2A is a diagram (1) for illustrating a modified example of a transmission coil in the wireless power transfer system of FIG. 1;

FIG. 2B is a diagram (2) for illustrating a modified example of the transmission coil in the wireless power transfer system of FIG. 1;

FIG. 2C is a diagram (3) for illustrating a modified example of the transmission coil in the wireless power transfer system of FIG. 1;

FIG. 7 is a diagram for illustrating a state of each power receiver in FIG. 6;

FIG. 8B is a diagram (2) for illustrating correspondence between the plurality of power sources and the plurality of power receivers;

FIG. 8C is a diagram (3) for illustrating correspondence between the plurality of power sources and the plurality of power receivers;

FIG. 9 is a diagram (4) for illustrating correspondence between the plurality of power sources and the plurality of power receivers;

FIG. 15C is a block diagram for illustrating an example of the wireless power transfer system of the third embodiment depicted in FIG. 14C;

FIG. 16 is a flowchart illustrating an example of an output control process of the power source by an entire controller in the wireless power transfer system according to the present embodiment;

FIG. 17 is a flowchart illustrating an example of a control process of a master device by the entire controller in the wireless power transfer system according to the present embodiment;

DESCRIPTION OF EMBODIMENTS

Figure 3A:
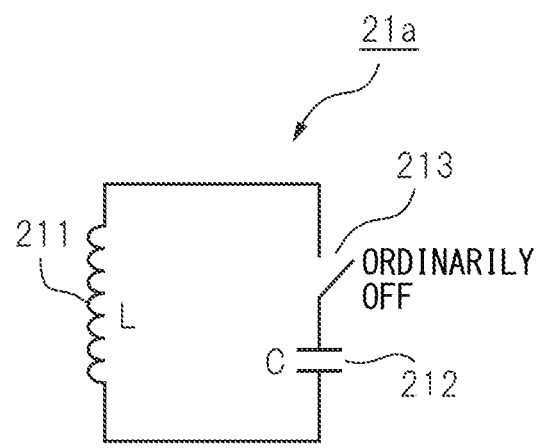
FIG. 3A is a circuit diagram (1) depicting an example of an independent resonance coil.

First, before describing embodiments of a wireless power transfer system and a wireless power transfer method, an example of a wireless power transfer system and a wireless power transfer system including a plurality of power sources and a plurality of power receivers according to a related art will be described, with reference to FIG. 1 to FIG. 9.

FIG. 1 is a block diagram schematically depicting one example of a wireless power transfer system. In FIG. 1, reference sign 1 denotes a primary side (a power source side: a power source), and reference sign 2 denotes a secondary side (a power receiver side: a power receiver).

As depicted in FIG. 1, power source 1 includes a wireless power transfer unit 11, a high frequency power supply unit 12, a power transfer control unit 13, and a communication circuit unit 14. In addition, power receiver 2 includes a wireless power reception unit 21, a power reception circuit unit 22, a power reception control unit 23, and a communication circuit unit 24.

The wireless power transfer unit 11 includes a first coil (a power supply coil) 11b and a second coil (a power source resonance coil) 11a, and the wireless power reception unit 21 includes a third coil (a power receiver resonance coil) 21a and a fourth coil (a power extraction coil) 21b.

As depicted in FIG. 1, the power source 1 and the power receiver 2 perform energy (electric power) transmission from the power source 1 to the power receiver 2 by magnetic field resonance (electric field resonance) between the power source resonance coil 11a and the power receiver resonance coil 21a. Power transfer from the power source resonance coil 11a to the c may be performed not only by magnetic field resonance but also electric field resonance or the like. However, the following description will be given mainly by way of example of magnetic field resonance.

The power source 1 and the power receiver 2 communicate with each other (near field communication) by the communication circuit unit 14 and the communication circuit unit 24. Note that, a distance of power transfer (a power transfer range PR) by the power source resonance coil 11a of power source 1 and the power receiver resonance coil 21a of power receiver 2 is set to be shorter than a distance of communication (a communication range CR) by the communication circuit unit 14 of power source 1 and the communication circuit unit 24 of power receiver 2 (PR<CR).

In addition, power transfer by the power source resonance coil 11a and the power receiver resonance coil 21a is performed by a system (an out-band communication) independent from communication by the communication circuit units 14 and 24. Specifically, power transfer by the resonance coils 11a and 21a uses, for example, a frequency band of 6.78 MHz, whereas communication by the communication circuit units 14 and 24 uses, for example, a frequency band of 2.4 GHz.

The communication by the communication circuit units 14 and 24 may use, for example, a DSSS wireless LAN system based on IEEE 802.11b or Bluetooth (registered trademark).

The above described wireless power transfer system performs power transfer using magnetic field resonance or electric field resonance by the power source resonance coil 11a of the power source 1 and the power receiver resonance coil 21a of the power receiver 2, for example, in a near field at a distance of about a wavelength of a frequency used. Accordingly, the range of power transfer (a power transfer range) PR varies with the frequency used for power transfer.

The high frequency power supply unit 12 supplies power to the power supply coil (the first coil) 11b, and the power supply coil 11b supplies power to the power source resonance coil 11a arranged very close to the power supply coil 11b by using electromagnetic induction. The power source resonance coil 11a transfers power to the power receiver resonance coil 21a (the power receiver 2) at a resonance frequency that causes magnetic field resonance between the resonance coils 11a and 21a.

The power receiver resonance coil 21a supplies power to the power extraction coil (the fourth coil) 21b arranged very close to the power receiver resonance coil 21a, by using electromagnetic induction. The power extraction coil 21b is connected to the power reception circuit unit 22 to extract a predetermined amount of power. The power extracted from the power reception circuit unit 22 is used, for example, for charging a battery in the battery unit (load) 25, as a power supply output to the circuits of power receiver 2, or the like.

Note that, the high frequency power supply unit 12 of power source 1 is controlled by the power transfer control unit 13, and the power reception circuit unit 22 of power receiver 2 is controlled by the power reception control unit 23. Then, the power transfer control unit 13 and the power reception control unit 23 are connected via the communication circuit units 14 and 24, and adapted to perform various controls so that power transfer from power source 1 to power receiver 2 may be performed in an optimum state.

FIG. 2A to FIG. 2C are diagrams for illustrating modified examples of a transmission coil in the wireless power transfer system of FIG. 1. Note that, FIG. 2A and FIG. 2B depict exemplary three-coil structures, and FIG. 2C depicts an exemplary two-coil structure.

Specifically, in the wireless power transfer system depicted in FIG. 1, the wireless power transfer unit 11 includes the first coil 11b and the second coil 11a, and the wireless power reception unit 21 includes the third coil 21a and the fourth coil.

On the other hand, in the example of FIG. 2A, the wireless power reception unit 21 is set as a single coil (a power receiver resonance coil: an LC resonator) 21a, and in the example of FIG. 2B, the wireless power transfer unit 11 is set as a single coil (a power source resonance coil: an LC resonator) 11a.

Further, in the example of FIG. 2C, the wireless power reception unit 21 is set as a single power receiver resonance coil 21a and the wireless power transfer unit 11 is set as a single power source resonance coil 11a. Note that, FIG. 2A to FIG. 2C are merely examples and, obviously, various modifications may be made.

FIG. 3A to FIG. 3D are circuit diagrams depicting examples of an independent resonance coil (the power receiver resonance coil 21a), and FIG. 4A to FIG. 4D are circuit diagrams depicting examples of a resonance coil (the power receiver resonance coil 21a) connected to a load or a power supply.

Note that, FIG. 3A to FIG. 3D correspond to the power receiver resonance coil 21a of FIG. 1 and FIG. 2B, and FIG. 4A to FIG. 4D correspond to the power receiver resonance coil 21a of FIG. 2A and FIG. 2C.

Figure 3B:
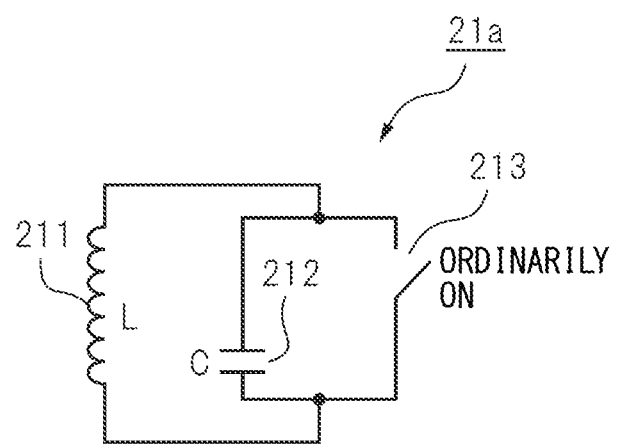
FIG. 3B is a circuit diagram (2) depicting an example of the independent resonance coil.
Figure 4A:
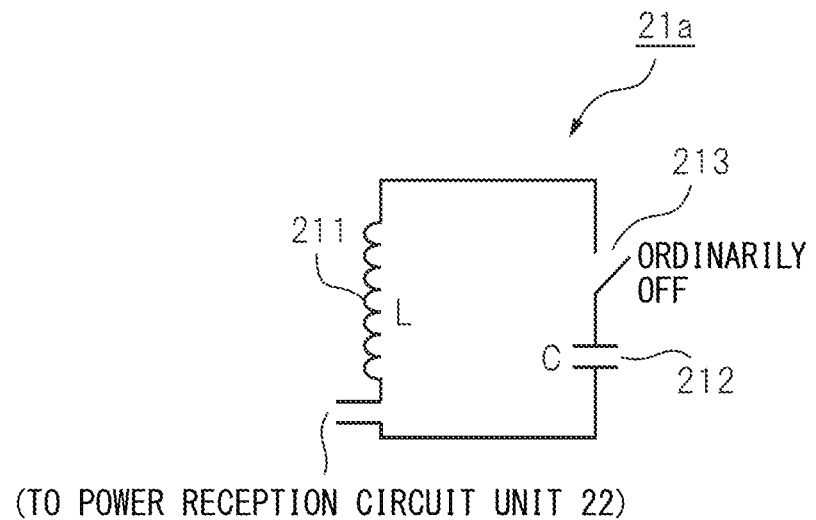
FIG. 4A is a circuit diagram (1) depicting an example of a resonance coil connected to a load or a power supply.

In the examples depicted in FIG. 3A and FIG. 4A, the power receiver resonance coil 21a includes a coil (L) 211, a capacitor (C) 212, and a switch 213 connected in series, in which the switch 213 is ordinarily in an off-state. In the examples depicted in FIG. 3B and FIG. 4B, the power receiver resonance coil 21a includes the coil (L) 211 and the capacitor (C) 212 connected in series, and the switch 213 connected in parallel to the capacitor 212, in which the switch 213 is ordinarily in an on-state.

Figure 3C:
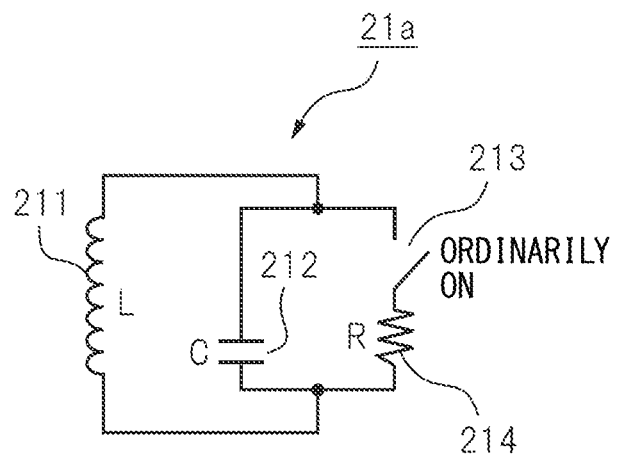
FIG. 3C is a circuit diagram (3) depicting an example of the independent resonance coil.
Figure 4B:
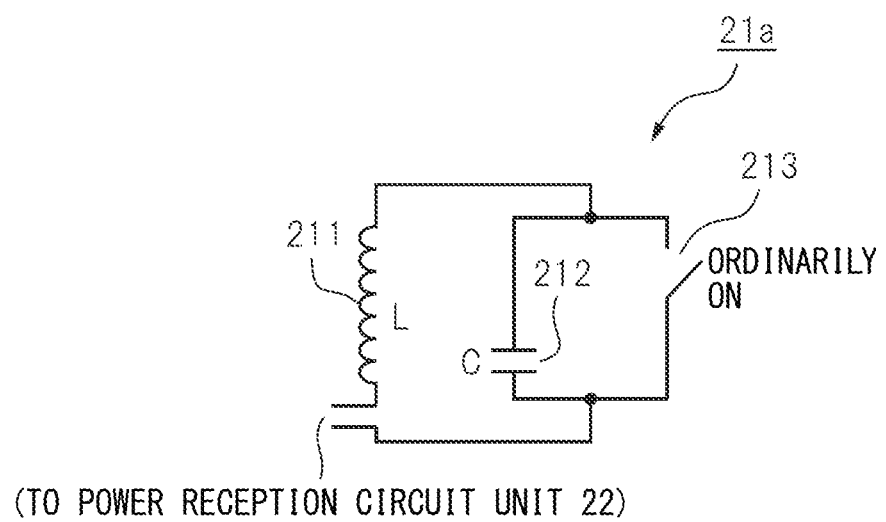
FIG. 4B is a circuit diagram (2) depicting an example of the resonance coil connected to the load or the power supply.
Figure 4C:
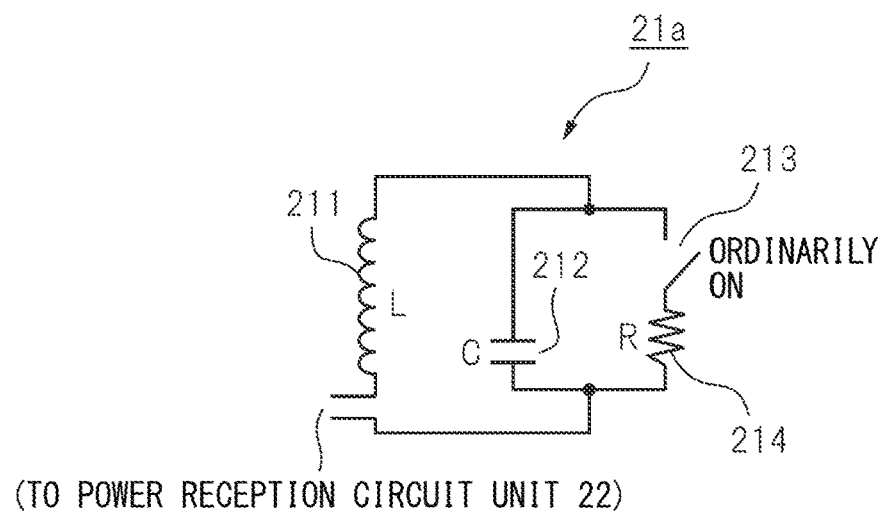
FIG. 4C is a circuit diagram (3) depicting an example of the resonance coil connected to the load or the power supply.

In the examples depicted in FIG. 3C and FIG. 4C, the power receiver resonance coil 21a of FIG. 3B and FIG. 4B includes the switch 213 and the resistance (R) 214 connected in series and arranged in parallel to the capacitor 212, in which the switch 213 is ordinarily in the on-state.

Figure 3D:
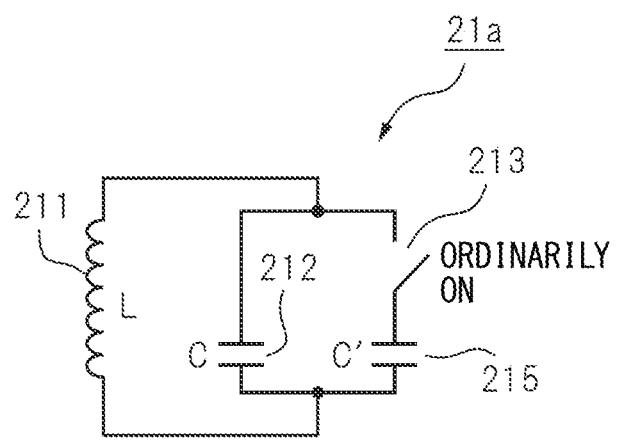
FIG. 3D is a circuit diagram (4) depicting an example of the independent resonance coil.
Figure 4D:
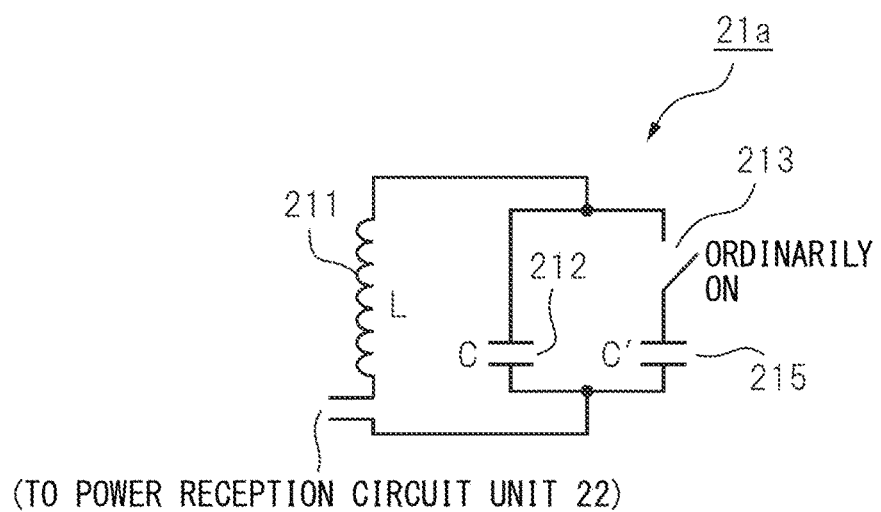
FIG. 4D is a circuit diagram (4) depicting an example of the resonance coil connected to the load or the power supply.

The examples of FIG. 3D and FIG. 4D depict the power receiver resonance coil 21a of FIG. 3B and FIG. 4B, in which the switch 213 and another capacitor (C') 215 connected in series are arranged in parallel to the capacitor 212, and the switch 213 is ordinarily in the on-state.

In each of the power receiver resonance coils 21a described above, the switch 213 is set to "off" or "on" so that the power receiver resonance coil 21a does not operate ordinarily. The reason for this is, for example, to prevent heat generation or the like caused by power transfer to a power receiver 2 not in use (on power receiver) or to a power receiver 2 out of order.

In the above structure, the power source resonance coil 11a of power source 1 may also be set as in FIG. 3A to FIG. 3D and FIG. 4A to FIG. 4D. However, the power source resonance coil 11a of the power source 1 may be set so as to operate ordinarily and may be controlled to be turned ON/OFF by an output of the high frequency power supply unit 12. In this case, in the power source resonance coil 11a, the switch 213 is to be short-circuited in FIG. 3A and FIG. 4A.

In this manner, when a plurality of power receivers 2 are present, selecting only the power receiver resonance coil 21a of a predetermined power receiver 2 for receiving power transmitted from the power source 1 and making the power receiver resonance coil 21a operable enables power to be transferred to the selected power receiver 2.

Figure 5A:
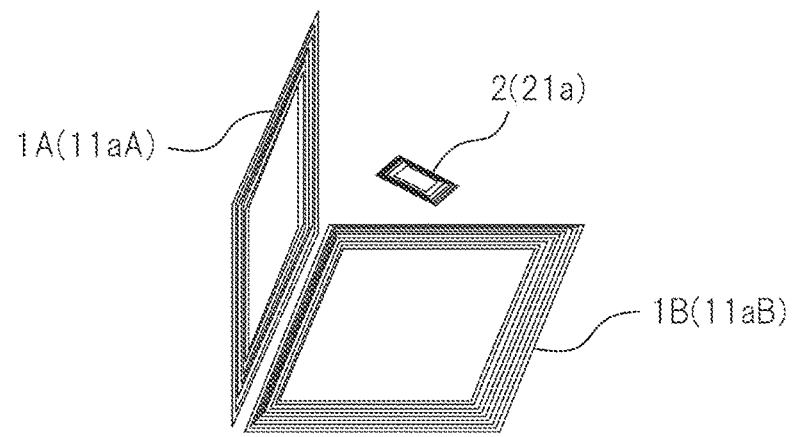
FIG. 5A is a diagram (1) for illustrating an example of controlling a magnetic field by a plurality of power sources.
Figure 5B:
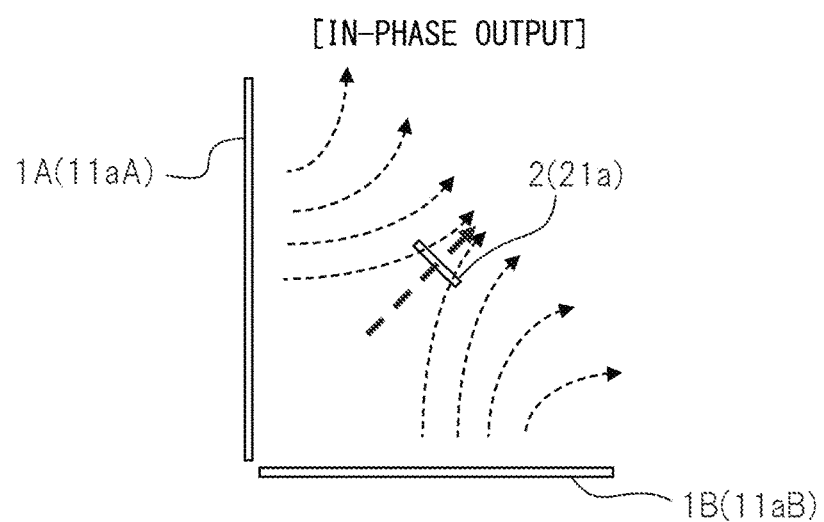
FIG. 5B is a diagram (2) for illustrating an example of controlling a magnetic field by the plurality of power sources.
Figure 5C:
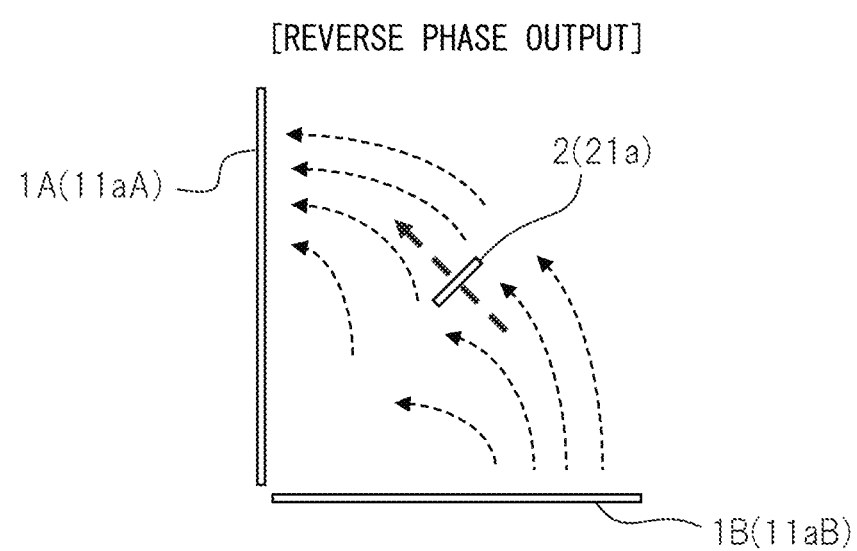
FIG. 5C is a diagram (3) for illustrating an example of controlling a magnetic field by the plurality of power sources.

FIG. 5A to FIG. 5C are diagrams for illustrating examples of controlling magnetic field by a plurality of power sources. In FIG. 5A to FIG. 5C, reference signs 1A and 1B denote power sources, and reference sign 2 denotes a power receiver.

As depicted in FIG. 5A, an power source resonance coil 11aA for power transfer used for magnetic field resonance of the power source 1A and an power source resonance coil 11aB for power transfer used for magnetic field resonance of the power source 1B are arranged, for example, so as to be orthogonal to each other.

Further, the power receiver resonance coil 21a used for magnetic field resonance of the power receiver 2 is arranged at a different angle (an angle not parallel) at a position surrounded by the power source resonance coil 11aA and the power source resonance coil 11aB.

Note that, the power source resonance coil (LC resonator) 11aA and 11aB for power transfer may also be provided in a single power source. In other words, a single power source 1 may include a plurality of wireless power transfer units 11.

Although details will be given later, designating one of the plurality of power sources as a master and the other one or more power sources as slaves means that a CPU (Central Processing Unit) of the single master power source controls all of the resonance coils included in the master power source and the slave power sources.

FIG. 5B depicts a situation in which the power source resonance coils 11aA and 11aB output an in-phase magnetic field, and FIG. 5C depicts a situation in which the power source resonance coils 11aA and 11aB output a reverse phase magnetic field.

For example, by comparing the cases where the power source resonance coils 11aA and 11aB output an in-phase magnetic field and a reverse phase magnetic field, a synthesized magnetic field becomes a 90° rotation relationship in each other, so that a power transfer is carried out to each power receiver 2 (power receiver resonance coil 21a) with suitably transmitting from the power source resonance coils 11aA and 11aB based on the postures of the power receiver 2.

As described above, when power is transferred to the power receiver 2 positioned at an arbitrary position and an arbitrary posture (angle) by the plurality of power sources 1A and 1B, magnetic fields occurring in the resonance coils 11aA and 11aB of the power sources 1A and 1B change variously.

In other words, the wireless power transfer system of the present embodiment includes a plurality of power sources and at least one power receiver and adjusts outputs (strengths and phases) between the plurality of power sources according to positions (X, Y and Z) and postures (θk, θy and θz) of the power receiver.

In addition, it will be seen that, with respect to three-dimensional space, for example, using three or more power sources in the actual three-dimensional space, by adjusting the respective output phase differences and the output intensity ratios, so that the synthesized magnetic field may be controlled to any direction in the three-dimensional space.

Figure 6:
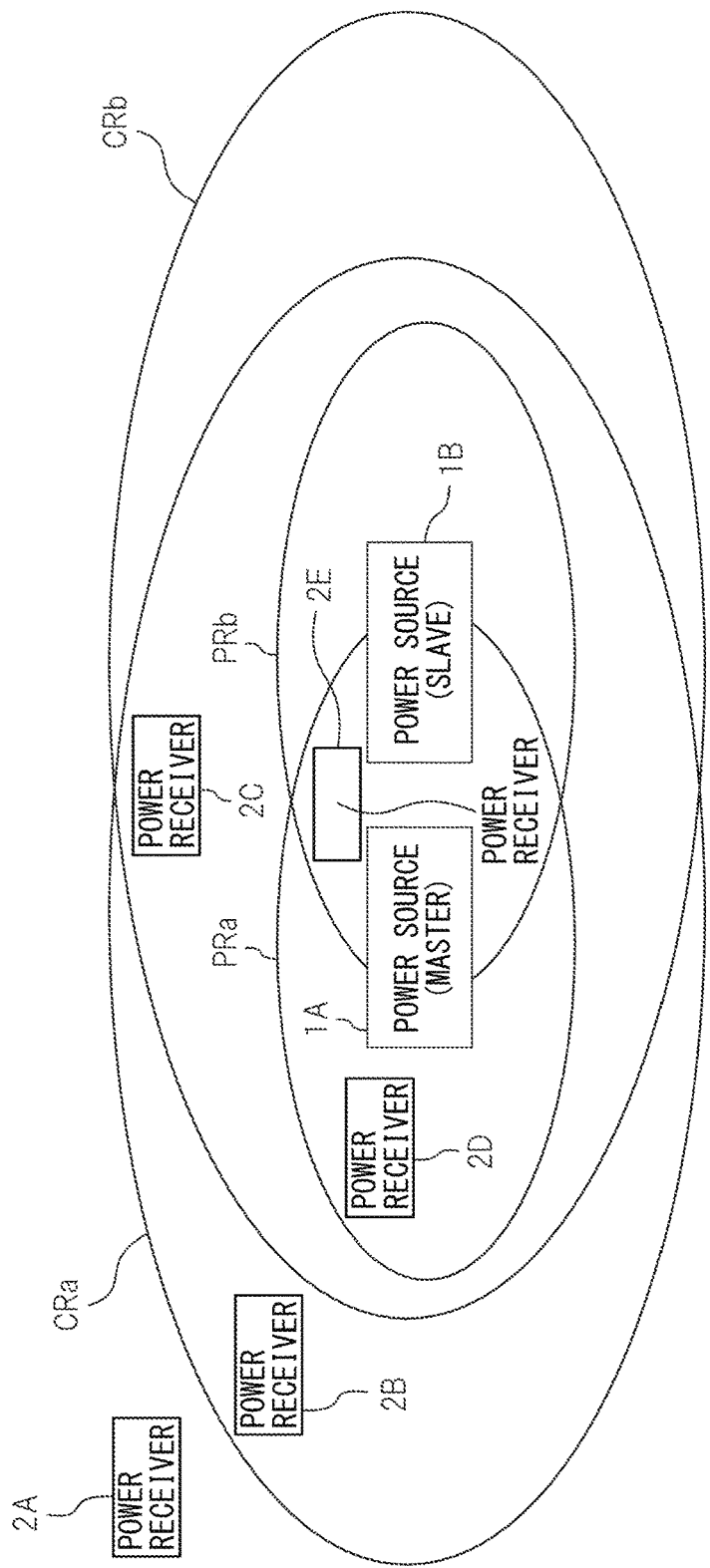
FIG. 6 is a diagram for illustrating an example of a correspondence between a plurality of power sources and a plurality of power receivers according to a related art.

FIG. 6 is a diagram for illustrating an example of a correspondence between a plurality of power sources and a plurality of power receivers according to a related art, and FIG. 7 is a diagram for illustrating a state of each power receiver in FIG. 6. Note that FIG. 6 and FIG. 7 illustrate the case where two power sources 1A and 1B and five power receivers 2A to 2E are arranged.

In the wireless power transfer system depicted in FIG. 6, the single power source 1A of the plurality of power sources 1A and 1B is designated as a master (primary) and the other power source 1B is designated as a slave (secondary). For example, the master (the power source 1A) determines processing such as optimization of the plurality of power sources and the power receiver.

In FIG. 6, reference sign PRa denotes a power transfer range of the power source 1A (a master power transfer range); reference sign PRb denotes a power transfer range of the power source 1B (a slave power transfer range). Further, reference sign CRa denotes a communication range of the power source 1A (a master communication range); and reference sign CRb denotes a communication range of the power source 1B (a slave communication range). Accordingly, statuses of the power receivers 2A to 2E are as follows.

Specifically, as depicted in FIG. 7, the power receiver 2A is outside the master communication range CRa (x), outside the slave communication range Crb, outside the master power transfer range PRa, and outside the slave power transfer range PRb, and simply waits for communication from the power sources.

Next, the power receiver 2B is located within the master communication range CRa (o), outside the slave communication range CRb, outside the master power transfer range PRa, and outside the slave power transfer range PRb. Thus, communicating with the master power source 1A allows for a confirmation that the power receiver 2B is outside the power ranges (outside the master and slave power transfer ranges).

In addition, the power receiver 2C is within the master communication range CRa, within the slave communication range CRb, outside the master power transfer range PRa, and outside the slave power transfer range PRb. Thus, communicating with the master and slave power sources 1A and 1B allows for a confirmation that the power receiver 2C is outside the power ranges.

In addition, the power receiver 2D is within the master communication range CRa, within the slave communication range CRb, within the master power transfer range PRa, and outside the slave power transfer range PRb. Thus, communicating with the master and slave power sources 1A and 1B allows for a confirmation that the power receiver 2D is within the power range of the power source 1A (within the master power transfer range PRa).

Additionally, the power receiver 2E is within the master communication range CRa, within the slave communication range CRb, within the master power transfer range PRa, and within the slave power transfer range PRb. Note that, the power receiver 2E communicates with the master and slave power sources 1A and 1B, and it is confirmed that the power receiver 2E is located within the power areas of the power sources 1A and 1B (within the power transfer ranges PRa and PRb).

Of the plurality of power sources, a single power source is determined as a master. The master may be determined, for example, depending on a condition in which a largest number of power receivers are located within the communication range of the power source or within the power transfer range thereof, as described later.

For example, when there is an equal condition in which each one power receiver is located within the communication ranges of the power sources, the master may be determined by adding an additional condition such as a communication strength between the power source and the power receiver, or an arbitrary one power source may be determined as a master using a random number table or the like.

When the power sources are of different manufacturers, optimization rules for strengths and phases of the power sources differ from each other. Thus, in the wireless power transfer system of the embodiment, designating one of the plurality of power sources as a master allows the master power source to control optimization for the power sources including the other one or more slave power sources.

Figure 8A:
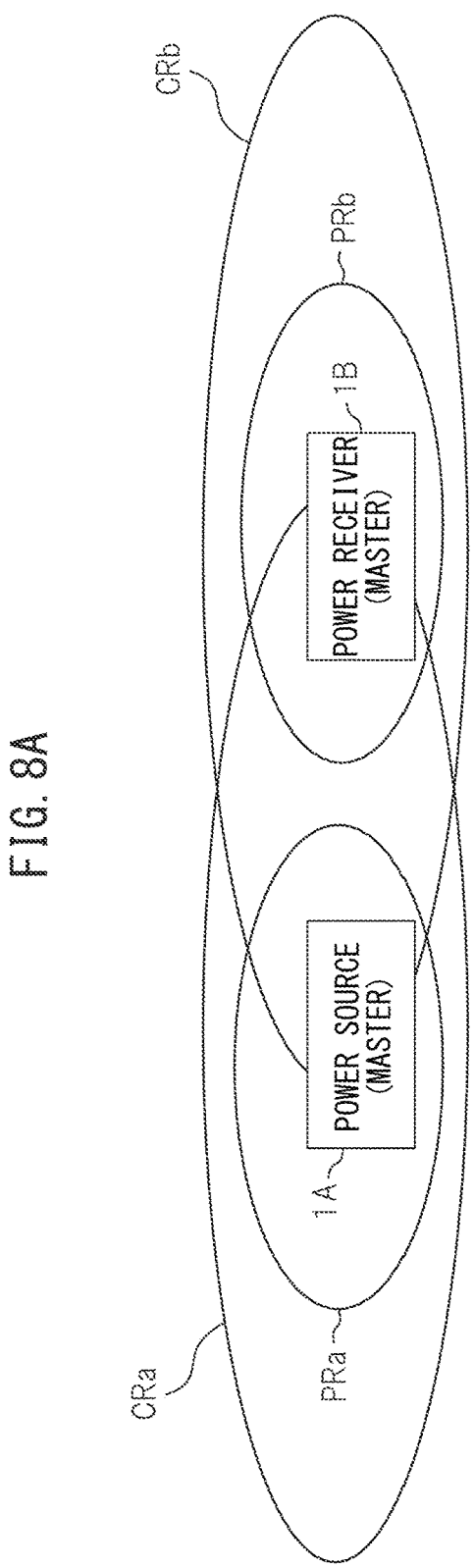
FIG. 8A is a diagram (1) for illustrating correspondence between the plurality of power sources and the plurality of power receivers.

FIG. 8A to FIG. 8C are diagrams for illustrating correspondence between the plurality of power sources and the plurality of power receivers, and illustrating how to determine a master and slaves in the plurality of power sources.

First, a master power source and slave power sources are determined in the plurality of power sources when the power sources are located within communication ranges (communication areas) of each other, power transfer ranges (power transfer areas) of the power sources overlap each other, and the relevant power receiver detects the overlapping of the power transfer ranges.

Specifically, FIG. 8A depicts a situation in which the communication range CRa of the power source 1A overlaps the communication range CRb of the power source 1B, whereas the power transfer range PRa of the power source 1A does not overlap the power transfer range PRb of the power source 1B. In this situation, since the power transfer ranges PRa and PRb do not overlap each other, both the power sources 1A and 1B are designated as respective master power sources.

Next, FIG. 8B depicts a situation in which the communication range CRa and the power transfer range PRa of the power source 1A overlap the communication range CRb and the power transfer range PRb of the power source 1B and the power receiver 2 is included in both the power transfer ranges PRa and PRb.

In the situation of FIG. 8B, the power sources 1A and 1B are located within the communication ranges CRa and CRb of each other, the power transfer ranges PRa and PRb overlap each other, and moreover, the power receiver 2 detects the overlapping of the power transfer ranges PRa and PRb.

Accordingly, in FIG. 8B, one (1A) of the power sources 1A and 1B is designated as a master power source and the other one (1B) thereof is designated as a slave power source. In this case, although the power source 1B may be designated as a master and the power source 1A may be designated as a slave, either one of the power sources 1A and 1B is designated as a master power source.

In addition, FIG. 8C depicts a situation in which the power sources 1A and 1B are arranged in the same positional relationship as that in FIG. 8B described above, but the power receiver 2 is not present (not located within the communication ranges CRa and CRb). In this situation, both the power sources 1A and 1B are designated as masters.

Similarly, when three or more power sources are arranged, for example, in the positional relationship corresponding to FIG. 8B, any one of the power sources is designated as a master power source. Various methods may be considered to designate a single master power source from the plurality of power sources. One example of the methods will be described with reference to FIG. 9.

FIG. 9 is a diagram (4) for illustrating correspondence between the and a plurality of power sources and the plurality of power receivers, in which four power sources 1A to 1D are arranged in a line. A communication range CRa of the power source 1A includes the power source 1B but does not include the power sources 1C and 1D. Similarly, a communication range CRd of the power source 1D includes the power source 1C but does not include the power sources 1A and 1B.

In addition, a communication range CRb of the power source 1B includes the power sources 1A and 1C but does not include the power source 1D. Similarly, a communication range CRc of the power source 1C includes the power sources 1B and 1D but does not include the power source 1A.

In the situation of FIG. 9, for example, the power source 1B is designated as a mater (a master power source) and the other power sources 1A, 1C and 1D are designated as slaves (slave power sources). Alternatively, the power source 1C may be designated as a master.

Meanwhile, designating the power source 1B as a master power source makes it difficult to directly communicate with the power source 1D. In this case, the power source 1B communicates with the power source 1D via the power source 1C to control optimization, and the like. Therefore, it is preferable to designate, as a master, a power source that may directly communicate with a largest number of power sources when designating a single master from a plurality of power sources.

Further, in FIG. 9, the four power sources 1A to 1D are arranged in a straight line. However, practically, a plurality of power sources will be disposed in various positional relationships, for example, by being embedded in a wall or a ceiling of a room, being built in a desk or a table, or being mounted on a floor, a table, or the like.

Next, an example of a power transfer area (power transfer range) in a wireless power transfer system including a plurality of power sources and power receivers, and problems caused therein will be explained with reference to FIG. 10 and FIG. 11.

Figure 10:
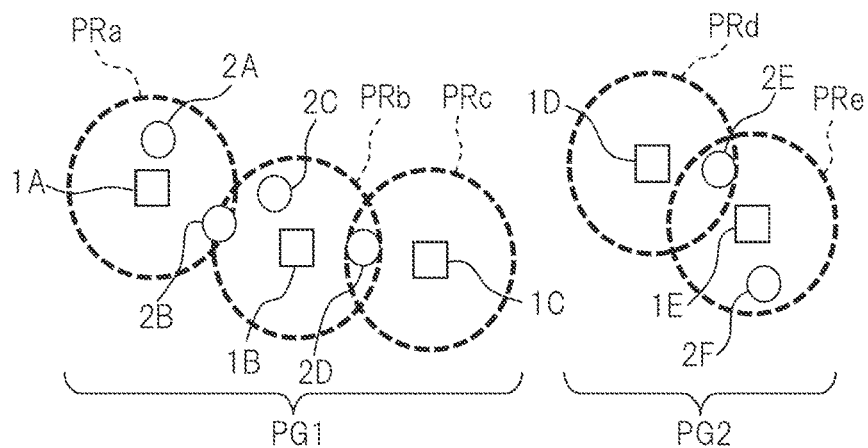
FIG. 10 is a diagram for illustrating one example of a power transfer range in the wireless power transfer system including a plurality of power sources and power receivers.

FIG. 10 is a diagram for illustrating one example of a power transfer range in the wireless power transfer system including a plurality of power sources and power receivers. In FIG. 10, reference signs 1A to 1E denote power sources, 2A to 2F denote power receivers, and PRa to PRe denote power transfer ranges of the power sources 1A to 1E, respectively.

In the wireless power transfer system depicted in FIG. 10, the power transfer ranges PRa to PRe generated by five power sources 1A to 1E are divided into two power transfer groups. Specifically, in the case of grouping a plurality of power sources, it is preferable to combine a plurality of power sources into one power transfer group where mutual power transfer ranges thereof are overlapped.

Specifically, in FIG. 10, three power sources 1A to 1C, where mutual power transfer ranges PRa to PRc of the power sources 1A to 1C are overlapped, are combined into a first power transfer group PG1, and two power sources 1D and 1E, where mutual power transfer ranges PRd and PRe of the power sources 1D and 1E are overlapped, are combined into a second power transfer group PG2.

Note that, in the first power transfer group PG1, the power transfer ranges PRa and PRc of the power sources 1A and 1C are not directly overlapped, however, the power transfer range PRb of the power source 1B is overlapped both the power transfer ranges PRa and PRc. Therefore, these three power sources 1A to 1C are combined into the same power transfer group.

Therefore, the power receivers 2A to 2D included in the first power transfer group PG1 are target power receivers to be performed power transfer by the power sources 1A to 1C, and the power receivers 2E and 2F included in the second power transfer group PG2 are target power receivers to be performed power transfer by the power sources 1D and 1E.

Specifically, each of the power receivers 2A to 2D receives optimized power wirelessly transferred from the power sources 1A to 1C of the first power transfer group PG1 by controlling phases and intensities of outputs of the power sources 1A to 1C based on positions and postures of respective receivers 2A to 2D.

Figure 11:
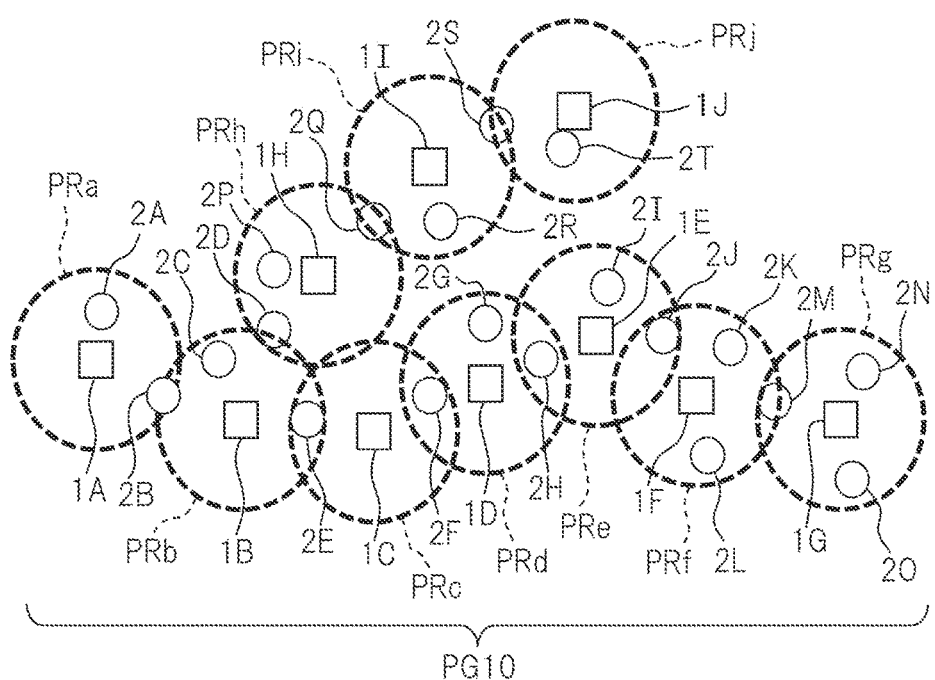
FIG. 11 is a diagram for illustrating another example of a power transfer range in the wireless power transfer system including a plurality of power sources and power receivers.

FIG. 11 is a diagram for illustrating another example of a power transfer range in the wireless power transfer system including a plurality of power sources and power receivers. In FIG. 11, reference signs 1A to 1J denote power sources, 2A to 2T denote power receivers, and PRa to PRj denote power transfer ranges of the power sources 1A to 1J, respectively.

Note that, above described FIG. 10 illustrates the case where five power sources 1A to 1E and six power receivers 2A to 2F are divided into two power transfer groups, however, FIG. 11 illustrates the case where ten power sources 1A to 1J and twenty power receivers 2A to 2T are densely provided.

Specifically, as depicted in FIG. 11, in the ten power sources 1A to 1J, when mutual power transfer ranges PRa to PRj are overlapped, these ten power sources 1A to 1J are combined into one power transfer group PG10.

Therefore, the twenty power receivers 2A to 2T included in the same power transfer group PG10 may be target power receivers to be performed power transfer by the ten power sources 1A to 1J, and the power receivers 2A and 2T may receive optimized power wirelessly transferred from the power sources 1A to 1J by controlling phases and intensities of outputs thereof based on positions and postures of respective receivers 2A to 2T.

Therefore, when a large number of power sources (for example, ten power sources) 1A to 1J are included in one power transfer group PG10, it is difficult to calculate optimized powers of respective power sources so as to perform power transfer to an optional one power receiver.

Specifically, so as to obtain optimized conditions of the power sources, a calculation time may become long, a memory capacity may become large, and computer spec (processing throughput of MPU) may become high. This means that the above values may be drastically increased, in accordance with increasing the number of the power sources.

In particular, calculations of magnetic field resonance simulation for optimizing outputs of respective power sources may be impossible to perform when power sources and power receivers are plural, since calculations of magnetic field resonance simulation for optimizing an output of one power source to one power receiver requires a large memory capacity and long calculation time.

Note that, each of the above described power sources 1A to 1J is not limited to an independent power source, but may be a power supply coil (power transfer resonant coil 11a). Specifically, for example, power source 1A and 1B depicted in FIG. 10 and FIG. 11 may be determined to two power supply coils of one power source.

Below, embodiments of a wireless power transfer system and a wireless power transfer method will be explained in detail with reference to the attached drawings.

Figure 12:
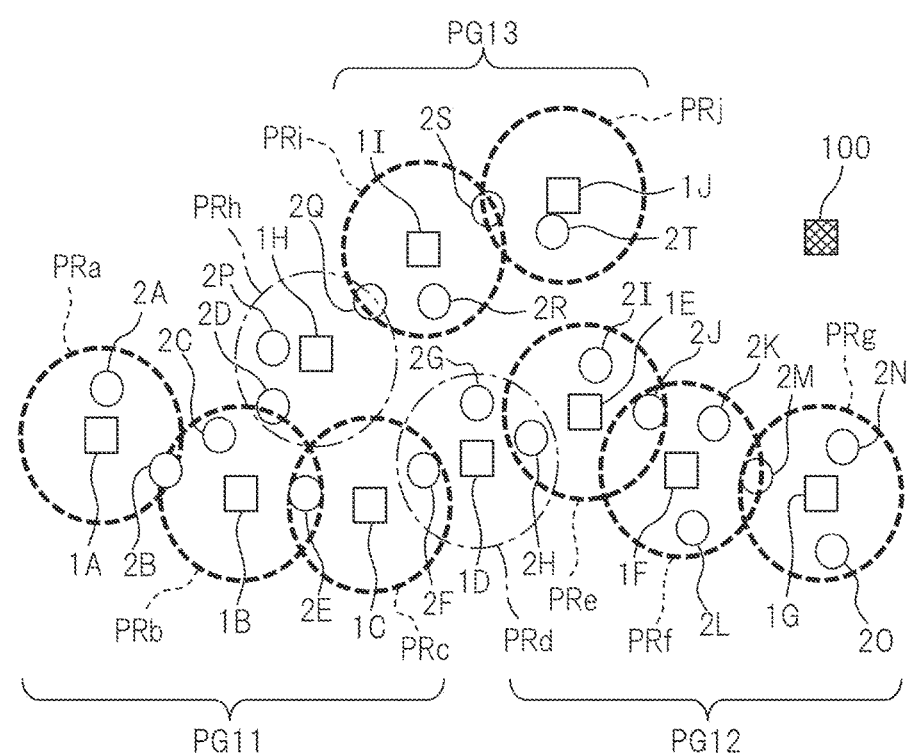
FIG. 12 is a diagram for illustrating an example of a wireless power transfer system of the present embodiment.

FIG. 12 is a diagram for illustrating an example of a wireless power transfer system of the present embodiment, corresponding to the wireless power transfer system depicted in FIG. 11 which includes ten power sources 1A to 1J and twenty power receivers 2A to 2T. In FIG. 12, reference sign 100 denotes an entire controller.

As apparently depicted by comparing FIG. 12 with above described FIG. 11, in the wireless power transfer system of this embodiment, for example, outputs of two power sources 1D and 1H in ten power sources 1A to 1J are stopped (OFF: power transfer stopped) by the entire controller 100.

Specifically, the entire controller 100 controls an entire wireless power transfer system by setting power sources to be stopped, cutting overlapping of power transfer ranges, and forming power transfer groups each including the predetermined maximum number of the power sources.

Note that, the entire controller 100 may communicate with all power sources 1A to 1J directly or via other power sources, and control to stop the power sources 1D and 1H by using those communications.

Therefore, by stopping two power sources 1D and 1H in ten power sources 1A to 1J, three power transfer groups PG11 to PG13 may be established.

Specifically, the transfer group PG11 includes three power sources 1A to 1C and six power receivers 2A to 2F, and the power transfer group PG12 includes three power sources 1E to 1G and eight power receivers 2H to 2O. Further, the power transfer group PG13 includes two power source 1I and 1J and four power receiver 2Q to 2T.

Note that, the entire controller 100 may confirm positions and power service areas (power transfer ranges of respective power sources, and estimate power transfer groups formed by switching ON (operating) any of power sources.

Further, the entire controller 100 may watch the number of power sources and power receivers included in each of the power transfer groups PG11 to PG13, and control the division of power transfer groups, so that the number of power sources and power receivers in the same power group does not exceed a predetermined number.

Specifically, in FIG. 12 illustrates the case when the number of power sources included in one power transfer group is equal or under three, that is, the maximum number of power sources whose power transfer rages overlapped is limited to three, and the number of power receivers included in one power transfer group is equal or under eight.

In the above, the power sources 1A to 1J are not independent power sources, but may be power supply coils (power transfer resonant coils 11a), as described above.

Figure 13:
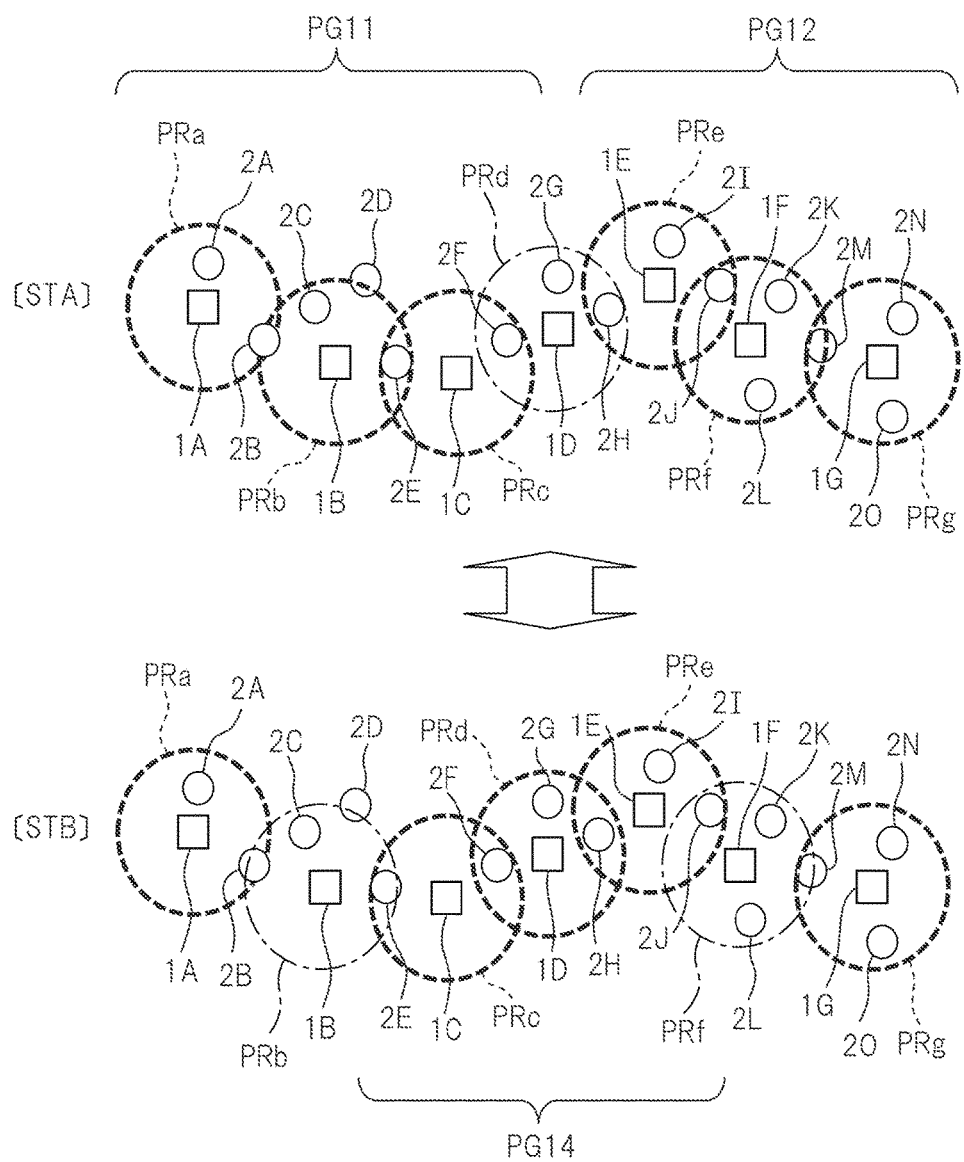
FIG. 13 is a diagram for illustrating a switching operation in the wireless power transfer system depicted in FIG. 12.

FIG. 13 is a diagram for illustrating a switching operation in the wireless power transfer system depicted in FIG. 12, and illustrates a part depicted in FIG. 12 wherein seven power sources 1A to 1G and fifteen power receivers 2A to 2O are included.

In FIG. 13, upper drawing corresponds to seven power sources 1A to 1G and fifteen power receivers 2A to 2O depicted in FIG. 12, which indicates a power transfer state STA wherein an output of one power source 1D is stopped and divided into two power transfer groups PG11 and PG 12.

In FIG. 13, lower drawing indicates a power transfer state STB wherein the output of the power source 1D is turned on, outputs of the power sources 1B and 1F are turned OFF, and divided into one power transfer group PG14 and single power sources (power transfer group including only one power source) 1A, 1G.

The power transfer state STA and STB may be switched in accordance with the control of the entire controller 100 by a predetermined time interval (for example, several minutes). Note that, the number of power transfer states (power transfer patterns) is not limited to two, i.e., over three, and at least three power transfer states may be sequentially switched.

Therefore, for example, the power receiver 2G, which does not receive power in the power transfer state STA, may be receive power in the power transfer state STB, by switching the plurality of power transfer patterns (power transfer states STA, STB). Note that, the power receivers 2C, 2D, 2K and 2L, which do not receive power in the power transfer state STB, may receive power in the power transfer state STA, so that power transfer may be performed to all of the power receivers.

Figure 14A:
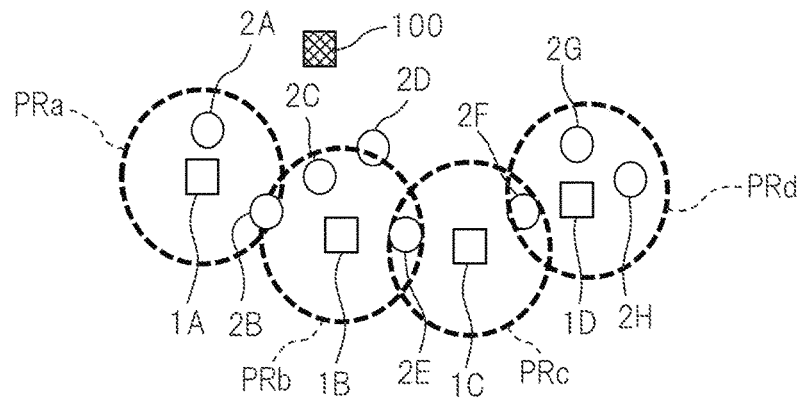
FIG. 14A is a diagram for illustrating a wireless power transfer system according to a first embodiment.
Figure 14B:
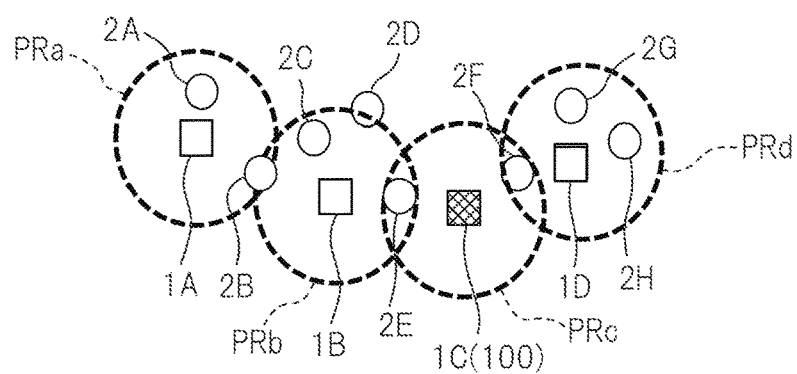
FIG. 14B is a diagram for illustrating a wireless power transfer system according to a second embodiment.
Figure 14C:
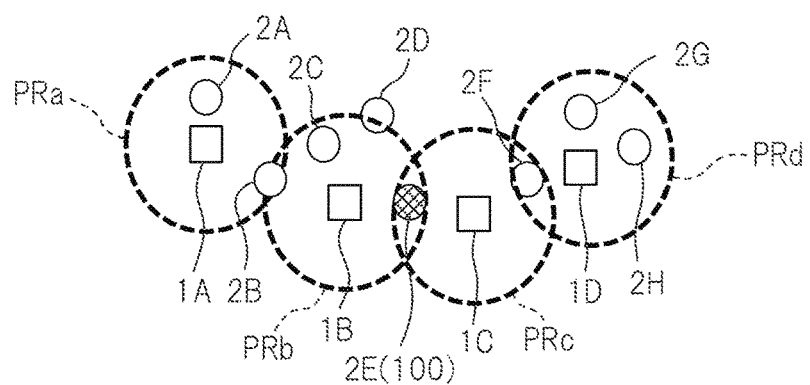
FIG. 14C is a diagram for illustrating a wireless power transfer system according to a third embodiment.

FIG. 14A is a diagram for illustrating a wireless power transfer system according to a first embodiment, FIG. 14B is a diagram for illustrating a wireless power transfer system according to a second embodiment, and FIG. 14C is a diagram for illustrating a wireless power transfer system according to a third embodiment. Note that, FIG. 14A to FIG. 14C indicate a part including four power sources 1A to 1D and eight power receivers 2A to 2H depicted in FIG. 12.

First, as depicted in FIG. 14A, in the wireless power transfer system of the first embodiment, the entire controller 100 is provided as a dedicated device which is different from the power sources 1A to 1D and power receivers 2A to 2H, as similar to above described FIG. 12.

That is, in the wireless power transfer system of the first embodiment, the entire controller 100 does not perform power transfer or receive power by itself, but the entire controller 100 controls ON/OFF of respective power sources, and adjusts phases and intensities of the respective power sources by using a server, or the like.

Further, as depicted in FIG. 14B, in the wireless power transfer system of the second embodiment, the entire controller 100 is provided as one power source 1C. Specifically, one of the power sources is used for the entire controller, that is, the power source 1C is adapted to function as the entire controller 100.

Further, as depicted in FIG. 14C, in the wireless power transfer system of the third embodiment, the entire controller 100 is provided as one power receiver 2E. Specifically, one of the power receivers is used for the entire controller, that is, the power receiver 2E is adapted to function as the entire controller 100.

Note that, for example, in the case of determining the power source 1C to the entire controller 100, the entire controller 100 may be set by applying the same method as that of determining the master power source which is explained with reference to FIG. 5A to FIG. 9. Note that, a communication system among the entire controller 100, the power sources 1A to 1D, and the power receivers 2A to 2H may be performed by either wired or wireless.

In the above, for example, the determination of the power source whose output is stopped by the entire controller 100 may be controlled according to the following conditions 1 and 2.

Condition 1: The number of power sources (power receivers) included in a power transfer group is set to be equal or less than a predetermined number.

Condition 2: The output of a power source used for performing power transfer (power supplying) to a high priority power receiver is not stopped.

Note that, the high priority power receiver is, for example, a power receiver whose remaining battery capacity is low or a power receiver specified to preferentially receive power by a user. Further, if there is a power receiver to be not received power due to stopped power sources, for example, preferentially performing power transfer to the power receiver to be not received power, and may divide again power transfer groups by applying the above conditions 1 and 2.

Therefore, an optimization for adjusting outputs of a plurality of power sources, which are closely provided and received mutually interferences each other, may be performed, so that a preferable power supplying (power transfer) may be realized.

Figure 15A:
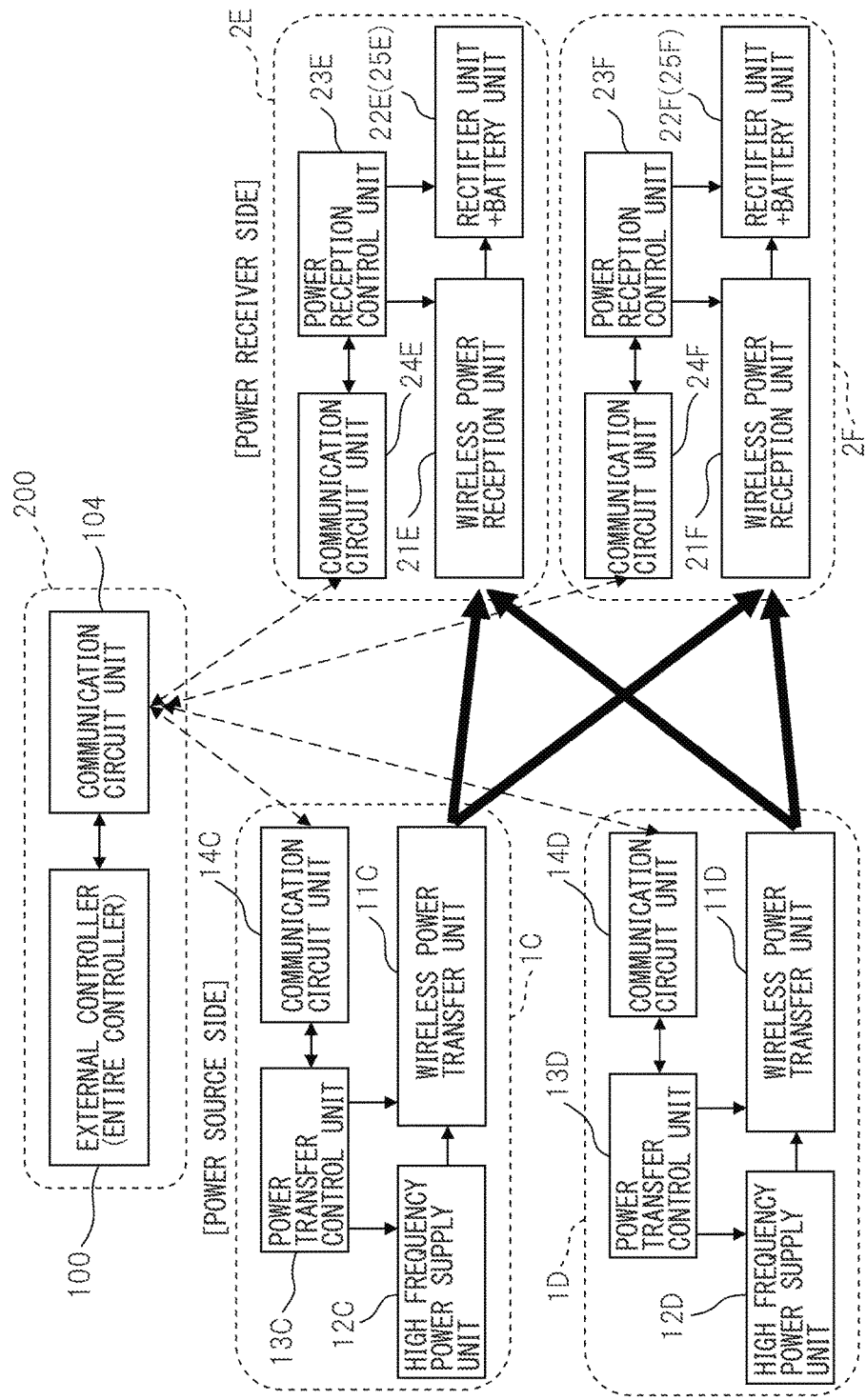
FIG. 15A is a block diagram for illustrating an example of the wireless power transfer system of the first embodiment depicted in FIG. 14A.

FIG. 15A is a block diagram for illustrating an example of the wireless power transfer system of the first embodiment depicted in FIG. 14A, and illustrates the entire controller 100 (entire control unit 200) together with two power sources and two power receivers 2E and 2F.

As depicted in FIG. 15A, the entire control unit 200, which is provided as a dedicated device different from the power sources and power receivers, includes an external controller (entire controller) 100 and a communication circuit unit 104. The power sources 1C and 1D include the same configurations, and the power source 1C, 1D includes a wireless power transfer unit 11C, 11D, a high frequency power supply unit 12C, 12D, a power transfer control unit 13C, 13D, and a communication circuit unit 14C, 14D.

The high frequency power supply unit 12C, 12D generates an electric power of a high frequency, for example, which corresponds to the high frequency power supply unit 12 depicted in FIG. 1 as described above. The power transfer control unit 13C, 13D controls the wireless power transfer unit 11C, 11D, and the communication circuit unit 14C, 14D enables to communicate among the entire control unit 200 and each of the power sources and power receivers.

Note that, the communication between the communication circuit unit 14C of the power source 1C, 1D, and the communication circuit unit 24E, 24F of the power receiver 2E, 2F may be performed by using, for example, a DSSS type wireless LAN based on the IEEE 802.11b or a Bluetooth (registered trademark).

Further, the communication between the power sources or the entire control unit 200 may be performed by using the above Bluetooth (registered trademark), and the like or wired or wireless LAN. In addition, the power sources 1C and 1D may be formed as two wireless power transfer units (11) provided in one power source 1.

The wireless power transfer unit 11C, 11D corresponds to a coil in the case of applying magnetic field resonance, and converts a high frequency power output from the high frequency power supply unit 12C, 12D into magnetic field.

The entire control unit 200 (external controller 100) may be supplied with information, for example, relative positional relationship of the power sources 1C and 1D, and relative positional relationship of the power receivers 2E and 2F. Note that, a method for detecting the positional relationship may be applied, for example, an imaging system by using a plurality of cameras.

The power receivers 2E and 2F include the same configurations, and the power receiver 2E, 2F includes a wireless power reception unit 21E, 21F, a rectifier (power receiving circuit) and a battery unit (apparatus body) 22E (25E), 22F (25F), a power reception control unit 23E, 23F, and a communication circuit unit 24E, 24F.

The power reception control unit 23E, 23F controls the power receiver 2E, 2F, and the communication circuit unit 24E, 24F enables to communicate among the entire control unit 200, the power sources and the power receivers, which may be realized by using, for example, a Bluetooth (registered trademark).

In the case of transferring power by using magnetic field resonance, the wireless power reception unit 21E, 21F is equivalent to a coil for converting an electric power wirelessly transmitted to a current. The rectifier 22E, 22F converts an alternating current obtained by the wireless power reception unit 21E, 21F to a direct current used for charging a battery or driving an apparatus body (25E, 25F).

As described above, the entire control unit 200, the power sources 1C and 1D, and the power receivers 2E and 2F may communicate each other by using respective communication circuit units 104, 14C, 14D, 24E, and 24F. Note that, the external controller 100 may control the power sources 1C and 1D, and the power receivers 2E and 2F.

Further, it is not limited to a wireless power transfer using magnetic field resonance between the wireless power transfer units 11C and 11D, and the wireless power reception units 21E or 21F, but, for example, electric field resonance, electromagnetic induction, and electric field induction may be also applied to the wireless power transfer system.

Figure 15B:
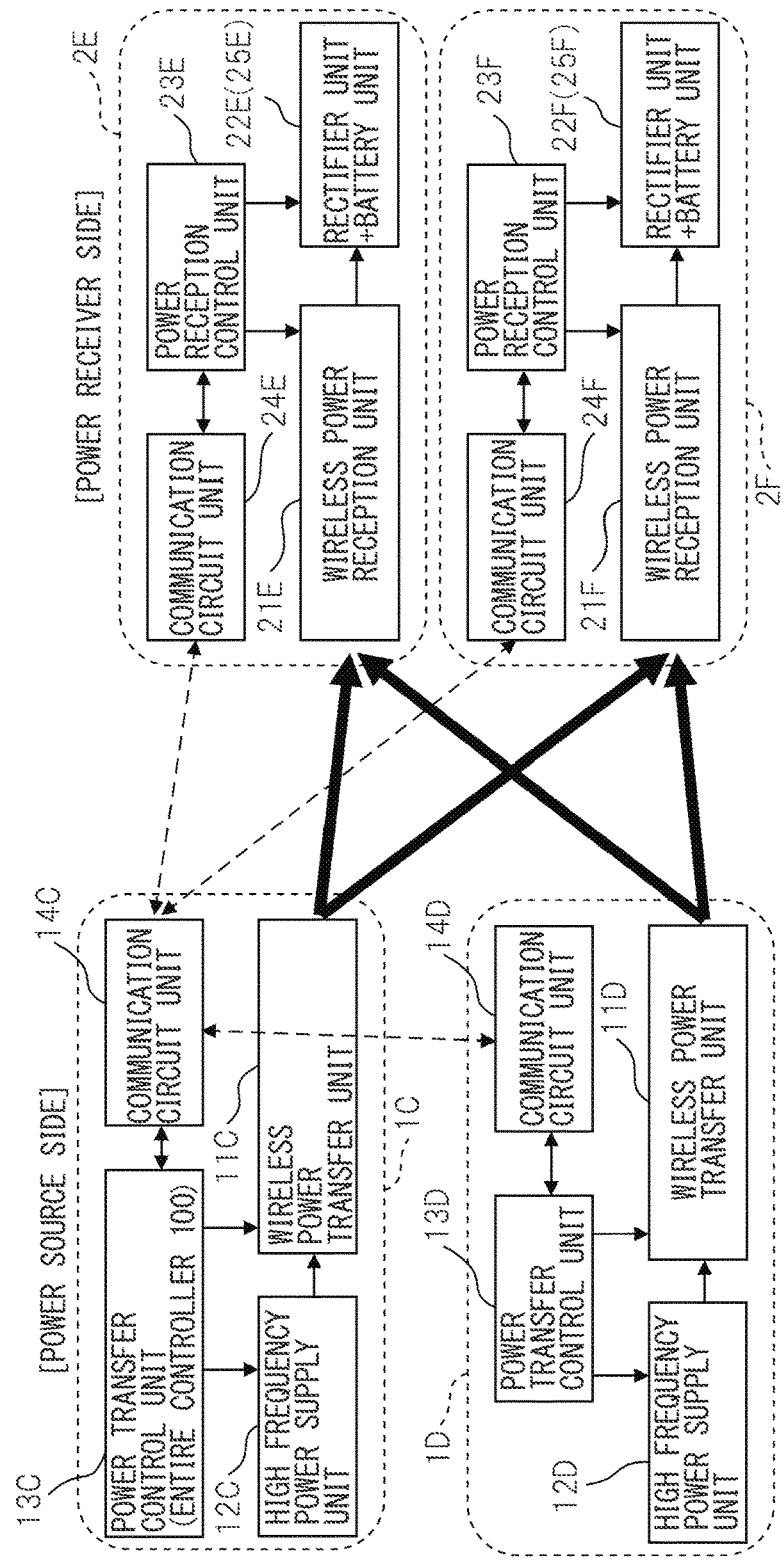
FIG. 15B is a block diagram for illustrating an example of the wireless power transfer system of the second embodiment depicted in FIG. 14B.

FIG. 15B is a block diagram for illustrating an example of the wireless power transfer system of the second embodiment depicted in FIG. 14B, and illustrates the case of using one power source 1C as the entire controller 100. Specifically, FIG. 15 illustrates an example wherein the power transfer control unit 13C of the power source 1C is used as the entire controller 100.

As apparently depicted by comparing FIG. 15B with above described FIG. 15A, the power transfer control unit 13C of an optional power source 1C of the plurality of power sources may be used as the entire controller 100 (entire control unit 200) without independently providing the dedicated device different from the power sources and power receivers.

In this case, the communication circuit unit 104 of the entire control unit 200 in FIG. 15A may be also used by the communication circuit unit 14C of the power source 1C, and therefore the hardware capacity may be reduced. Note that, the power transfer control unit 13C of the power source 1C may be required high processing capacity CPU (MPU) than that of the power transfer control units of the other power sources.

FIG. 15C is a block diagram for illustrating an example of the wireless power transfer system of the third embodiment depicted in FIG. 14C, and illustrates the case of using one power receiver 2E as the entire controller 100, that is, illustrates an example wherein the power reception control unit 23E of the power receiver 2E is used as the entire controller 100.

As apparently depicted by comparing FIG. 15 with above described FIG. 15A, the power reception control unit 23E of an optional power receiver 2E of the plurality of power receivers may be used as the entire controller 100 (entire control unit 200) without independently providing the dedicated device different from the power sources and power receivers.

In this case, the communication circuit unit 104 of the entire control unit 200 depicted in FIG. 15A may be also used by the communication circuit unit 24E of the power receiver 2E, and therefore the hardware capacity may be reduced. Note that, the power reception control unit 23E of the power receiver 2E may be required high processing capacity CPU than that of the power transfer control units of the other power receivers.

FIG. 16 is a flowchart illustrating an example of an output control process of the power source by an entire controller in the wireless power transfer system according to the present embodiment.

When staring an output control process of the power source by the entire controller, in step ST11, the entire controller searches positional relationships among respective power sources and power receivers, and battery statuses and received power amounts of respective power receivers. Specifically, the entire controller 100 performs information gathering by individually communicating with each of the power sources and power receivers, and the processing proceeds to step ST12.

In step ST12, the entire controller detects provisional power transfer groups (provisional power transfers G) based on power ranges of respective power sources, and the processing proceeds to step ST13. In step ST13, the entire controller determines whether or not the number of power sources and power receivers included in each of the provisional power transfers G is equal or lower than a predetermined number.

In step ST13, in the case of determining that the number of power sources and power receivers included in each of the provisional power transfers G is equal or lower than the predetermined number, the processing proceeds to step ST14, and the provisional power transfers G are determined to actual power transfer groups (power transfers G). Concretely, in above described FIG. 12, it is illustrated that the number of power sources is equal or lower than three and the number of power receivers is equal or lower than eight included in each of the provisional power transfers G (PG11 to PG13).

Further, the processing proceeds to step ST15, the entire controller considers transfer conditions in the respective power transfers G, and instructs output conditions to each of the power sources of respective power transfers G. Further, the processing proceeds to step ST16, and wireless power transferring and receiving operations will be performed.

On the other hand, in step ST13, it is determined that the number of power sources and power receivers included in each of the provisional power transfers G is not equal or lower than the predetermined numbers, the processing proceeds to step ST17, and the provisional power transfers G is improved so as to the numbers of the power sources and power receivers lower than the predetermined numbers. Specifically, in step ST17, the entire controller determines new transfer groups G1, G2, G3, . . . , Gn, and the processing proceeds to step ST18.

In step ST18, the entire controller considers transfer conditions in the respective power transfers G, and instructs the output conditions to each of the power sources of respective power transfers G, and the processing proceeds to step ST19, and the wireless power transfer may be performed in a predetermined time.

Further, the process proceeds to step ST20, the entire controller considers transfer conditions in the transfer group G2, and instructs the output conditions to each of the power sources of respective power transfers G2, and the processing proceeds to step ST21, and the wireless power transfer may be performed in a predetermined time.

Further, the processing proceeds to step ST22, the entire controller returns to step ST11 and repeatedly performs the same processes, after performing the above processes of steps ST18, 19 and steps ST20, 21 until for transfer group Gn. Note that, the output control processes of the power source performed by the entire controller depicted in FIG. 16 is merely an example, and various modifications may be possible.

FIG. 17 is a flowchart illustrating an example of a control process of a master device by the entire controller in the wireless power transfer system according to the present embodiment. In FIG. 17, the master device corresponds to the master power source explained above with reference to FIG. 14B, and FIG. 6 to FIG. 9. Note that, in the case of applying a power receiver to the master device as depicted in FIG. 14C, the master power source may be considered as the master power receiver.

When staring a control process of the master device by the entire controller, in step ST31, the entire controller searched positional relationships among respective power sources and power receivers, and battery statuses and received power amounts of respective power receivers. Specifically, the entire controller 100 performs information gathering by individually communicating with each of the power sources and power receivers, and the processing proceeds to step ST32.

In step ST32, the entire controller detects provisional power transfer groups (provisional power transfers G) based on power ranges of respective power sources, and the processing proceeds to step ST33. In step ST33, the entire controller determines whether or not the number of power sources and power receivers included in each of the provisional power transfers G is equal or lower than a predetermined number.

In step ST33, in the case of determining that the number of power sources and power receivers included in each of the provisional power transfers G is equal or lower than a predetermined number, the processing proceeds to step ST34, and the provisional power transfers G are determined to power transfers G (actual power transfer groups).

Further, the processing proceeds to step ST35, the entire controller considers transfer conditions in the respective power transfers G, and selects a master power source in each of the power transfers G. Further, the processing proceeds to step ST36, and wireless power transferring and receiving operations will be performed by the master power source.

Specifically, the entire controller only selects the master power source, and the selected master power source may consider the transfer conditions in the respective power transfers G, instruct output conditions to each of the power sources of respective power transfers G, and control wireless power transferring and receiving operations.

On the other hand, in step ST33, it is determined that the number of power sources and power receivers included in each of the provisional power transfers G is not equal or lower than the predetermined numbers, the processing proceeds to step ST37, and the provisional power transfers G is improved so as to the numbers of the power sources and power receivers lower than the predetermined numbers. Specifically, in step ST37, the entire controller determines new transfer groups G1, G2, G3, . . . , Gn, and the processing proceeds to step ST38.

In step ST38, the entire controller selects a master power source in the respective power transfers G, and the processing proceeds to step ST39, and the wireless power transfer may be performed in a predetermined time.

Specifically, the entire controller only performs the selection of the power sources to be stopped and the selection of the master power source (step ST38), and the selected master power source may control the wireless power transferring and receiving operations in respective power transfers G.

Further, the processing proceeds to step ST40, the entire controller considers transfer conditions in the respective power transfers G2, and instruct output conditions to each of the power sources of respective power transfers G2. Further, the processing proceeds to step ST41, and wireless power transferring and receiving operations in the respective power transfers G may be performed by the master power source in a predetermined time. Specifically, the selected master power source control the wireless power transferring and receiving operations in the respective power transfers G.

Further, the processing proceeds to step ST42, the entire controller returns to step ST31 and repeatedly performs the same processes, after performing the above processes of steps ST38, 39 and steps ST40, 41 until for transfer group Gn. Note that, the output control processes of the power source performed by the entire controller depicted in FIG. 17 is merely an example, and various modifications may be possible.

Figure 18:
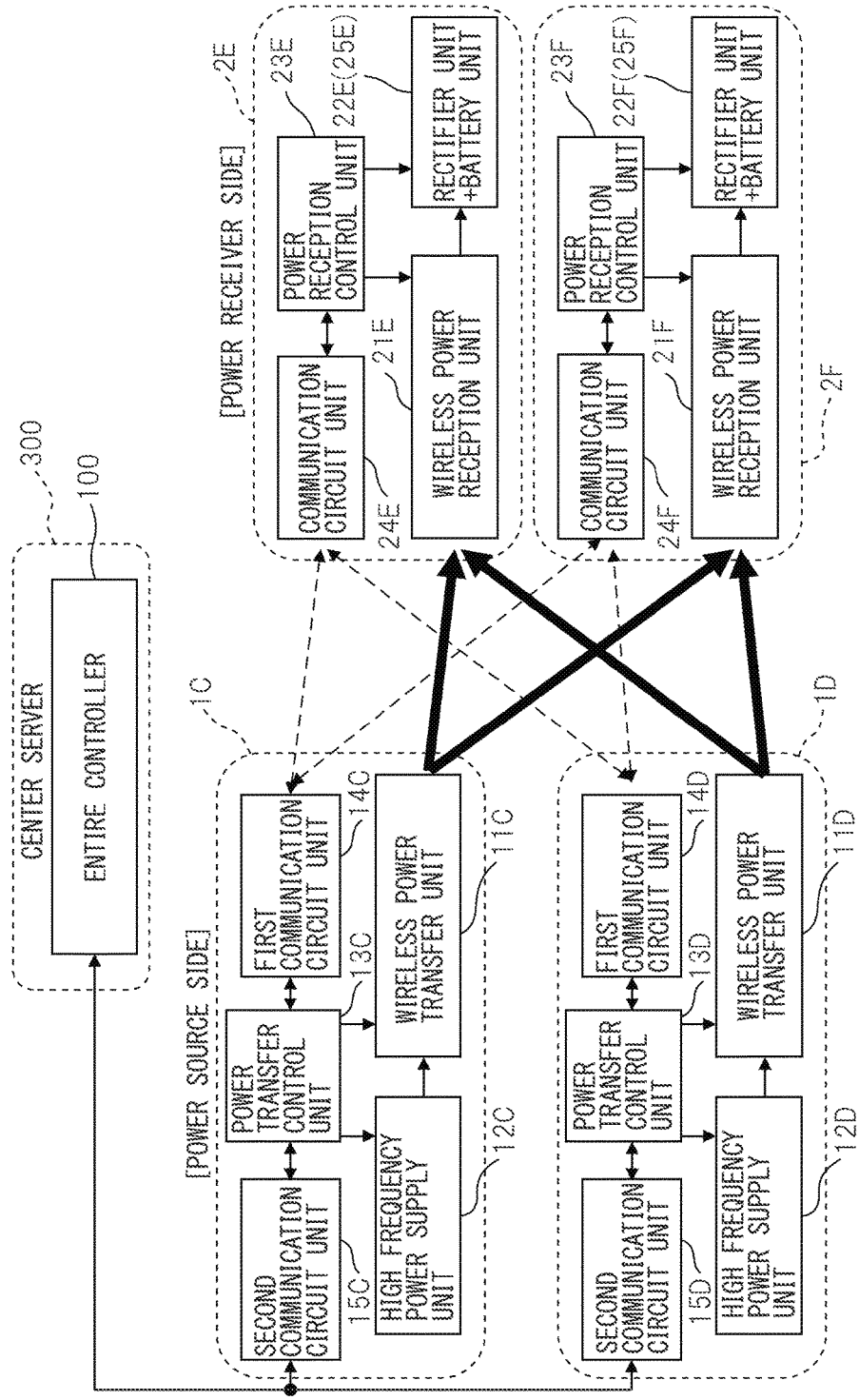
FIG. 18 is a block diagram for illustrating a modified example of the wireless power transfer system of the first embodiment.

FIG. 18 is a block diagram for illustrating a modified example of the wireless power transfer system of the first embodiment. As apparently depicted by comparing FIG. 18 with above described FIG. 15A, in the wireless power transfer system of FIG. 18, the entire controller 100 is provided in a center server 300.

The power source 1C includes a first communication circuit unit 14C and a second communication circuit unit 15C, the power source 1D includes a first communication circuit unit 14D and a second communication circuit unit 15D. Note that, the first communication circuit unit 14C, 14D of the power source 1C, 1D may correspond to the communication circuit unit 14C, 15C depicted in above described FIG. 15A, and perform near field communication by using, for example, a Bluetooth (registered trademark).

Specifically, respective power sources 1C and 1D establish near field communication with all power receivers 2E and 2F included in the power transfer range by using the first communication circuit units 14C and 14D, so that mutual information may be exchanged each other.

Note that, the mutual information exchanged between the power source 1C, 1D and the power receiver 2E, 2F includes power receiver information such as position information of respective power receivers 2E, 2F and power information (battery status/received power amount).

The second communication circuit unit 15C, 15D of the power source 1C, 1D performs communication with the entire controller provided in the center server 300 by using cloud computing system via, for example, a wired LAN, the Internet line, and the like.

The communication between the second communication circuit unit 15C, 15D and the entire controller 100 is not limited to the wired communication, and further, the center server 300 is not limited to the use of the cloud computing system via the Internet.

Specifically, for example, the center server 300 and the second communication circuit units in home or office may be wired connections, and in the home or office, the second communication circuit units may be connected by a wireless LAN using a wireless LAN router, or the like.

Note that, information exchanged between the power source 1C, 1D and the entire controller 100 via the second communication circuit unit 15C, 15D may include power source information for output conditions or positions of respective power sources 1C and 1D, in addition to the power receiver information via the first communication circuit unit 14C, 14D.

Therefore, the center server 300 (entire controller 100) optimizes transfer groups based on the power source information transmitted from the power source 1C, 1D via the second communication circuit unit 15C, 15D and the power receiver information.

When the power transfer group is too large, the entire controller 100 selects power sources to be stopped, and divides the large power transfer group into a plurality of optimized size power transfer groups. Further, the entire controller 100 transfers output instructions (current strength and phase information) to respective power sources, and performs the optimizations of the power transfer groups. Note that, the entire controller 100 may switch power transfer groups by changing the power sources to be stopped.

Specifically, by providing the entire controller 100 to the center server 300, that is, by using the center server 300 which includes a large processing capacity as the entire controller 100, an optimized power transfer calculation may be performed in a short time.

Therefore, the wireless power transfer system depicted in FIG. 18 may be preferable to apply, for example, companies or public facilities or commercial wireless power transfer systems where power transfer may be performed from a large number of power sources to a large number of power receivers.

Figure 19:
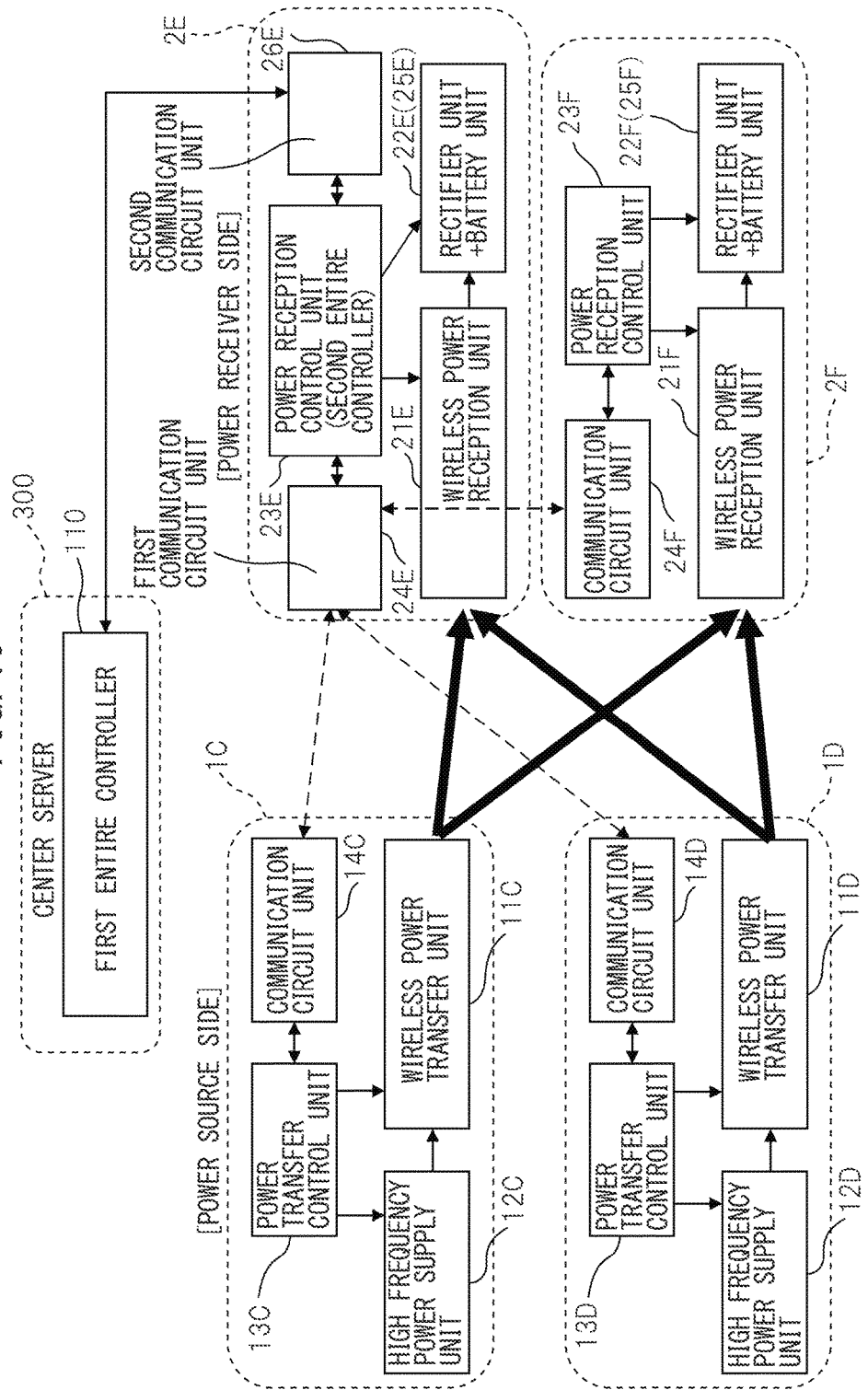
FIG. 19 is a block diagram for illustrating another modified example of the wireless power transfer system of the first embodiment.

FIG. 19 is a block diagram for illustrating another modified example of the wireless power transfer system of the first embodiment, and corresponds to the wireless power transfer system by combining the modification depicted in FIG. 18 with the wireless power transfer system depicted in above described FIG. 15C.

As apparently depicted by comparing FIG. 19 with FIG. 18 and FIG. 15C, the wireless power transfer system depicted in FIG. 19 includes a first entire controller 110 provided in the center server 300, and a second entire controller 120 provided in the power reception control unit 23E of the power receiver 2E.

Specifically, the power receiver 2E includes a second communication circuit unit 26E which performs telecommunications with the center server 300, in addition to a first communication circuit unit 24E which performs near field communication between the power sources 1C, 1D and another power receiver 2F by using the Bluetooth (registered trademark) and the like.

Note that, when the power receiver 2E is a mobile phone or smartphone, the second communication circuit unit 26E may be used both originally provided communication circuit, for example, 3G or 4G network (for example, LTE (Long Term Evolution) or WCDMA (Wideband Code Division Multiplexing Access).

Further, the center server 300 (first entire controller 110) optimizes transfer groups based on the power source information and the power receiver information similar to those explained with reference to FIG. 18, which are transmitted via the second communication circuit unit 26E of the power receiver 2E.

Note that, the power sources 1C, 1D in the same power transfer group and another power receiver 2F are, for example, controlled by the second entire controller 120 of the power receiver 2E, similar to the wireless power transfer system depicted in FIG. 15C, without considering the first entire controller 110 of the center server 300.

Note that, the communication between the power receiver 2E and the first entire controller 110 (center server 300) may not always performed, for example, only performed when exceeding the processing capacity of the second entire controller 120 provided in the power receiver 2E.

Therefore, a calculation of optimum power transfer may be performed by the first entire controller 110, the calculation results are transmitted to respective power sources 1C and 1D via the second entire controller 120 provided in the power receiver 2E, so that power transfer for the power receivers 2E and 2F are performed. Note that, the second entire controller 120 provided in the power reception control unit 23E of the power receiver 2E may be, for example, provide in the power transfer control unit 13E of the power source 1E.

Therefore, by utilizing an external center server 300 including a large processing capacity as an entire controller, a calculation of optimum power transfer may be performed in a short time, so that selection of power transfer groups or power transfer of the respective power transfer groups may be efficiently performed.

Figure 20:
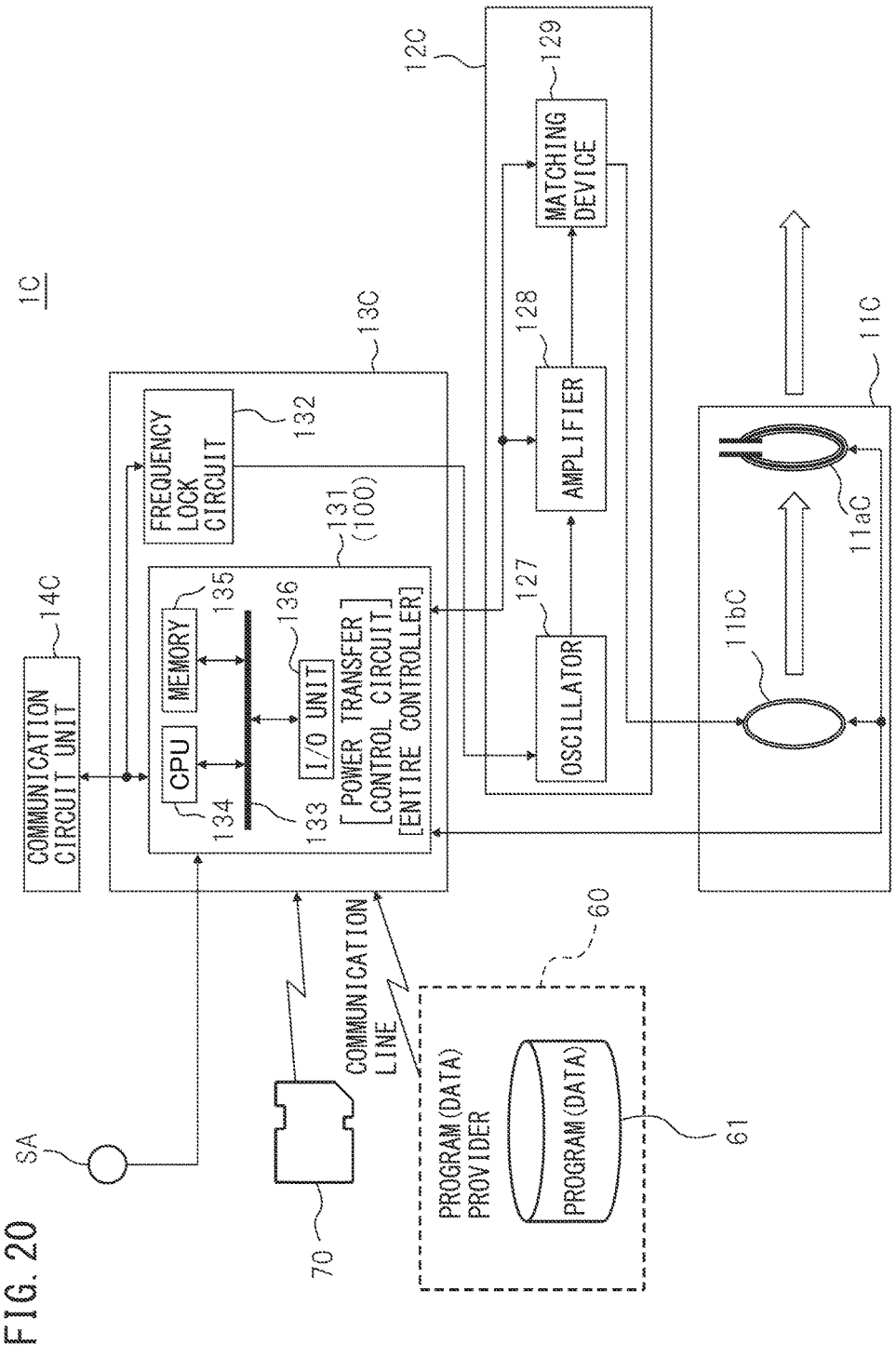
FIG. 20 is a block diagram for illustrating an example of the power source in the wireless power transfer system depicted in FIG. 15B.

FIG. 20 is a block diagram for illustrating an example of the power source (power source 1C provided with an entire controller 100) in the wireless power transfer system depicted in FIG. 15B.

As depicted in FIG. 20 and FIG. 15B, in the power source 1C, the wireless power transfer unit 11C includes an LC resonator 11aC and a power supply coil 11bC. A high frequency power supply unit 12C includes an oscillator 127, an amplifier 128 and a matching device 129.

The power transfer control unit 13C includes a power transfer control circuit 131 and a frequency lock circuit 132. Note that, the power transfer control circuit 131 actuates as the entire controller 100. The frequency lock circuit 132 receives a synchronization signal from the communication circuit unit 14C, and performs a synchronization process of the oscillator 127 by a predetermined interval (for example, several minutes to several ten minutes interval).

The oscillator 127 generates a driving signal having a predetermined frequency (for example, 6.78 MHz), and the driving signal is output to the wireless power transfer unit 11C (power supply coil 11bC) via the amplifier 128 and the matching device 129.

The power transfer control circuit 131 includes a CPU (processor) 134 connected by an internal bus 133, a memory 135 and an input-output circuit (I/O unit) 136. The memory 135 includes a rewritable non-volatile memory, e.g., a flash memory, and a DRAM (Dynamic Random Access Memory), and the like. Then, various processes (software programs) may be performed in the power source 1C, the slave power source 1B and power receivers.

The power source 1C includes, for example, a detection unit SA for checking a relative positional relationship between the power source 1C and the slave power source 1B. The output of the detection unit SA is, for example, input to the CPU 134 via the I/O unit 136, and is used to perform a software program (wireless power transfer program, or control program of the power source) stored in the memory 135.

The wireless power transfer program stored in a portable recording medium (for example, an SD (Secure Digital) memory card) 70, may be stored in the memory 135 via the I/O unit 136.

Alternatively, the program may be read out from a hard disk device 61 of a program (data) provider 60 via a communication line and the I/O unit 135, and stored in the memory 135. The communication line from the hard disk device 61 to the I/O unit 136 may be a wireless communication line by using the communication circuit unit 14.

Further, the recording medium (computer-readable recording medium) to which the portable wireless power transfer program is recorded may be a DVD (Digital Versatile Disk), a Blu-ray disc (Blu-ray Disc), and the like.

In the above description of respective embodiments, a power transfer is mainly explained by using magnetic field resonance. Nevertheless, the present embodiment may apply to the power transfer using electric field resonance.

All examples and conditional language provided herein are intended for the pedagogical purposes of aiding the reader in understanding the invention and the concepts contributed by the inventor to further the art.

Further, the above examples and conditions are not to be construed as limitations to such specifically recited examples and conditions, nor does the organization of such examples in the specification relate to a showing of the superiority and inferiority of the invention.

In addition, although one or more embodiments of the present invention have been described in detail, it should be understood that the various changes, substitutions, and alterations could be made hereto without departing from the spirit and scope of the invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless power transfer system including a plurality of power supply coils, and wirelessly performing power transfer from the power supply coils to a power receiver, comprising:

an entire controller configured to control the power transfer performed by wirelessly transmitting and receiving powers of the power supply coils and the power receiver, in accordance with confirming power transfer ranges of the plurality of power supply coils, wherein the entire controller is configured to determine a power transfer group by stopping a transmission output of at least one power supply coil in the plurality of power supply coils, and the entire controller is configured to select the at least one power supply coil for stopping the transmission output, so as to control the number of the power supply coils included in the power transfer group without exceeding a first threshold value.

2. The wireless power transfer system as claimed in claim 1, wherein
the entire controller is configured to determine the power transfer group by considering a priority of the power receiver.

3. The wireless power transfer system as claimed in claim 1, wherein
the entire controller is configured to determine at least two power transfer groups, and sequentially switch the at least two power transfer groups.

4. The wireless power transfer system as claimed in claim 1, wherein
the wireless power transfer system includes a plurality of power sources; and
each of the power sources includes at least one power supply coil of the plurality of power supply coils.

5. The wireless power transfer system as claimed in claim 4, wherein
the entire controller is provided separately from the power sources and the power receivers.

6. The wireless power transfer system as claimed in claim 5, wherein
the entire controller is provided in a center server.

7. The wireless power transfer system as claimed in claim 6, wherein
the center server is configured to control output intensities and phases of the power supply coils by communicating with the power sources via wireless communication lines.

8. The wireless power transfer system as claimed in claim 1, wherein
the wireless power transfer system includes a plurality of power sources; and
each of the power sources includes a power supply coil.

9. The wireless power transfer system as claimed in claim 8, wherein
the entire controller is provided in the power source.

10. The wireless power transfer system as claimed in claim 8, wherein
the entire controller is provided in the power receiver.

11. The wireless power transfer system as claimed in claim 8, wherein
the entire controller includes:
a first entire controller provided in a center server; and
a second entire controller provided in the power source or the power receiver, wherein
the first entire controller and the second entire controller are connected via a wireless communication line.

12. The wireless power transfer system as claimed in claim 1, wherein
the power transfer from the power supply coils to the power receiver is a wireless power transfer by using magnetic field resonance or electric field resonance.

13. A wireless power transfer system including a plurality of power supply coils, and wirelessly performing power transfer from the power supply coils to a power receiver, comprising:

an entire controller configured to control the power transfer performed by wirelessly transmitting and receiving powers of the power supply coils and the power receiver, in accordance with confirming power transfer ranges of the plurality of power supply coils, wherein
the entire controller is configured to determine a power transfer group by stopping a transmission output of at least one power supply coil in the plurality of power supply coils, and
the entire controller is configured to select the at least one power supply coil for stopping the transmission output, so as to control the number of the power receivers included in the power transfer group without exceeding a second threshold value.

14. A wireless power transfer system including a plurality of power supply coils, and wirelessly performing power transfer from the power supply coils to a power receiver, comprising:
an entire controller configured to control the power transfer performed by wirelessly transmitting and receiving powers of the power supply coils and the power receiver, in accordance with confirming power transfer ranges of the plurality of power supply coils, wherein
the entire controller is configured to determine a power transfer group by stopping a transmission output of at least one power supply coil in the plurality of power supply coils, and
the entire controller is configured to select the at least one power supply coil for stopping the transmission output, so as to control a total number of the power supply coils and the power receivers included in the power transfer group without exceeding a third threshold value.

15. A wireless power transfer method for wirelessly performing power transfer from a plurality of power supply coils to a power receiver, comprising:
confirming power transfer ranges of the plurality of power supply coils;
controlling the power transfer performed by wirelessly transmitting and receiving powers of the power supply coils and the power receiver, in accordance with the confirmed power transfer ranges of the plurality of power supply coils;
determining a power transfer group by stopping a transmission output of at least one power supply coil in the plurality of power supply coils; and
selecting the at least one power supply coil for stopping the transmission output, so as to control the number of the power supply coils included in the power transfer group without exceeding a first threshold value.

16. The wireless power transfer method as claimed in claim 15, wherein the wireless power transfer method further comprises:
determining at least two power transfer groups; and
sequentially switching the at least two power transfer groups.

17. A non-transitory computer-readable storage medium storing a wireless power transfer program for wirelessly performing power transfer from a plurality of power supply coils to a power receiver, wherein the wireless power transfer program causes a computer to execute:
confirming power transfer ranges of the plurality of power supply coils;
controlling the power transfer performed by wirelessly transmitting and receiving powers of the power supply coils and the power receiver, in accordance with the confirmed power transfer ranges of the plurality of power supply coils;

determining a power transfer group by stopping a transmission output of at least one power supply coil in the plurality of power supply coils; and selecting the at least one power supply coil for stopping the transmission output, so as to control the number of the power supply coils included in the power transfer group without exceeding a first threshold value.

* * * * *